United States Patent
Shaffer

(10) Patent No.: US 10,603,967 B2
(45) Date of Patent: Mar. 31, 2020

(54) PIVOTING TRAILER HITCH

(71) Applicant: Ryan E. A. S. Shaffer, Three Rivers, MI (US)

(72) Inventor: Ryan E. A. S. Shaffer, Three Rivers, MI (US)

( * ) Notice: Subject to any disclaimer, the term of this patent is extended or adjusted under 35 U.S.C. 154(b) by 114 days.

(21) Appl. No.: 15/703,468

(22) Filed: Sep. 13, 2017

(65) Prior Publication Data

US 2018/0126811 A1 May 10, 2018

Related U.S. Application Data

(60) Provisional application No. 62/420,320, filed on Nov. 10, 2016.

(51) Int. Cl.
| | | |
|---|---|---|
| *B60D 1/46* | (2006.01) | |
| *B60D 1/42* | (2006.01) | |
| *B60D 1/44* | (2006.01) | |
| *B60D 1/06* | (2006.01) | |

(52) U.S. Cl.
CPC .............. *B60D 1/42* (2013.01); *B60D 1/06* (2013.01); *B60D 1/44* (2013.01); *B60D 1/46* (2013.01)

(58) Field of Classification Search
CPC ... B60D 1/42; B60D 1/44; B60D 1/46; B60D 1/06
See application file for complete search history.

(56) References Cited

U.S. PATENT DOCUMENTS

| | | | |
|---|---|---|---|
| 2,745,680 A | 5/1956 | Achenbach et al. | |
| 3,944,259 A * | 3/1976 | Miller | B60D 1/363 280/475 |
| 4,261,594 A | 4/1981 | Corbett et al. | |
| 4,792,153 A | 12/1988 | Galdes | |
| 5,322,313 A | 6/1994 | Schroeder | |
| 5,511,813 A * | 4/1996 | Kravitz | B60D 1/42 280/495 |
| 5,547,210 A | 8/1996 | Dugger | |
| 5,558,351 A | 9/1996 | Hunter | |
| 6,042,137 A * | 3/2000 | McIntosh | B60D 1/07 280/462 |
| 6,789,815 B2 * | 9/2004 | Moss | B60D 1/06 280/416.1 |
| 7,556,279 B2 | 7/2009 | Suhling | |

(Continued)

*Primary Examiner* — Tony H Winner
(74) *Attorney, Agent, or Firm* — Larry E. Henneman, Jr.; Henneman & Associates, PLC

(57) ABSTRACT

A trailer coupling mechanism includes a first end, a second end, a height adjustment assembly, a first swivel assembly, and a second swivel assembly. The first end is adapted to couple to one of a trailer and a vehicle. The second end is adapted to couple to the other of the trailer and the vehicle. The height adjustment assembly is coupled between the first and second ends and is operative to adjust the relative height between the first and second ends. The first swivel assembly is coupled between the height adjustment assembly and the first end and facilitates rotation of the first end with respect to the height adjustment assembly about a first axis. The second swivel assembly is coupled between the second end and the height adjustment assembly and facilitates rotation of the height adjustment assembly with respect to the second end about a second axis parallel to the first axis.

47 Claims, 20 Drawing Sheets

(56) References Cited

U.S. PATENT DOCUMENTS

| | | | |
|---|---|---|---|
| 7,584,984 B1 * | 9/2009 | Williams, Jr. | B60D 1/00 280/478.1 |
| 7,850,192 B2 | 12/2010 | Ceccarelli et al. | |
| 8,474,852 B1 | 7/2013 | Granados | |
| 8,733,780 B2 * | 5/2014 | Williams, Jr. | B60D 1/155 280/477 |
| 8,789,842 B2 * | 7/2014 | Williams, Jr. | B60D 1/04 280/406.1 |
| 9,193,233 B2 * | 11/2015 | Schwarz | B60D 1/42 |
| 9,944,138 B2 * | 4/2018 | Kemper | B60D 1/46 |
| 10,086,879 B2 * | 10/2018 | Schmeichel | B62D 25/163 |
| 2004/0222614 A1 * | 11/2004 | Lindenman | B60D 1/06 280/455.1 |
| 2007/0057485 A1 * | 3/2007 | Lones | B60D 1/07 280/416.1 |
| 2007/0235982 A1 * | 10/2007 | Cumbie | B60D 1/155 280/478.1 |
| 2008/0164678 A1 * | 7/2008 | White | B60D 1/143 280/504 |
| 2010/0013189 A1 * | 1/2010 | Pollock | B60D 1/02 280/490.1 |
| 2011/0140393 A1 * | 6/2011 | Padilla | B60D 1/06 280/490.1 |
| 2012/0112433 A1 * | 5/2012 | Williams, Jr. | B60D 1/04 280/490.1 |
| 2013/0307250 A1 * | 11/2013 | Scott | B60D 1/075 280/511 |
| 2015/0203049 A1 * | 7/2015 | Eichmann | B60D 1/42 224/509 |

* cited by examiner

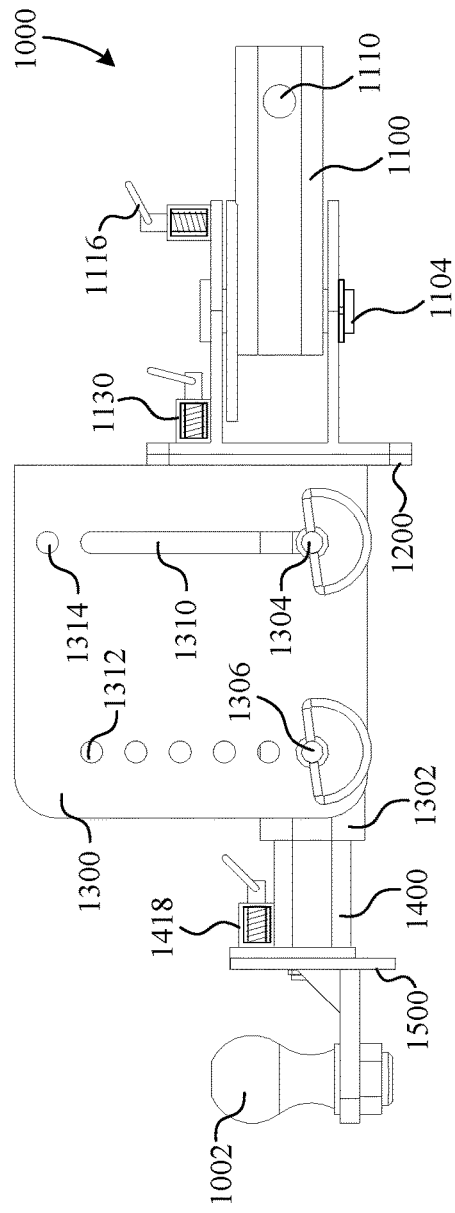
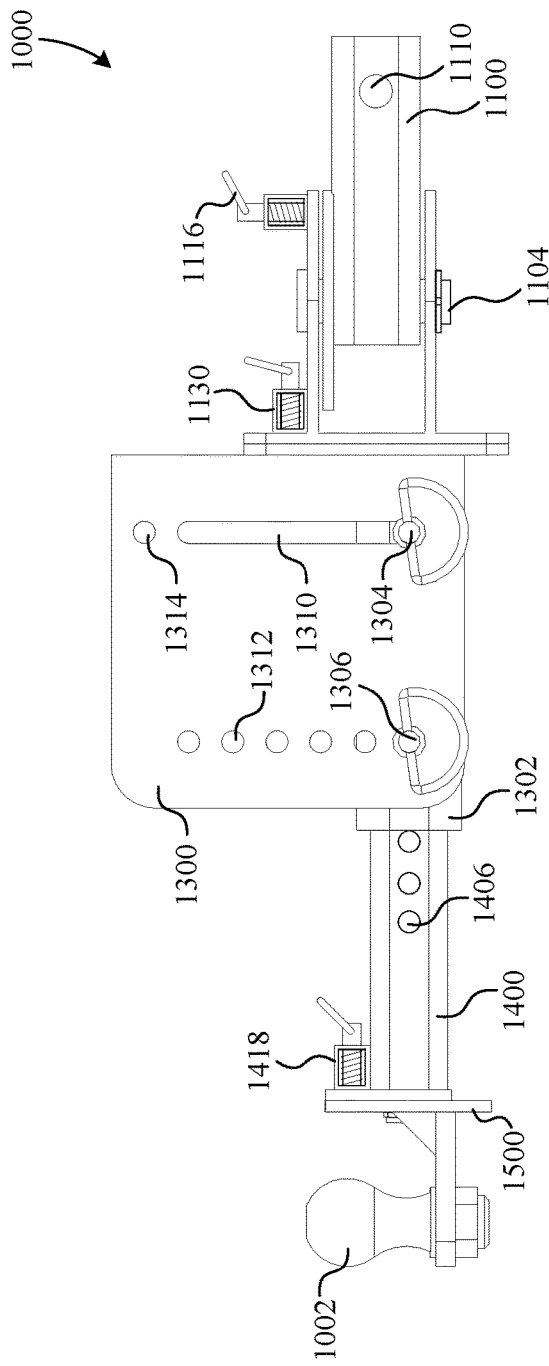
FIG. 18A
FIG. 18B

PIVOTING TRAILER HITCH

CROSS-REFERENCE TO RELATED APPLICATIONS

This application claims the benefit of U.S. Provisional Patent Application Ser. No. 62/420,320, filed on Nov. 10, 2016 by the same inventor, which is incorporated by reference herein in its entirety.

BACKGROUND OF THE INVENTION

Field of the Invention

This invention relates generally to automotive trailer tongues and hitches. More particularly, the invention relates to an adjustable trailer tongue that is adapted to engage a misaligned trailer ball. The invention also relates to an adjustable hitch assembly that mounts to a towing vehicle and is adapted to engage a misaligned trailer tongue.

Description of the Background Art

Connecting the ball of a tow vehicle to the coupler of a trailer is a challenging task. The ball is typically bolted to a ball mount (e.g., a draw bar), which is mounted to a hitch (e.g., in a receiver hitch) located at the rear end of the vehicle. The coupler is mounted on the tongue of the trailer and is adapted to receive the ball of the tow vehicle. Perhaps the most difficult challenge encountered in connecting the ball to the coupler is aligning the two. Doing so typically requires a driver to back up the vehicle and a spotter outside of the vehicle to precisely guide the driver. Even with a spotter, it is not unusual for the driver to take several attempts before the ball and coupler are aligned sufficiently for the coupler to engage the ball when the trailer tongue is lowered.

There are several devices on the market that attempt to alleviate the aforementioned challenges. For example, many new vehicles come standard with backup cameras. Such cameras are typically mounted on the rear end of the vehicle to allow the driver to see the ball from inside the cab of the vehicle. Although such cameras are useful, aligning the ball with the coupler still requires just as much precision and often requires multiple attempts. Furthermore, cameras typically only provide an overhead view which does not show whether or not the ball and coupler are vertically aligned, only horizontally aligned.

SUMMARY

The present invention overcomes the problems associated with the prior art by providing trailer coupling mechanisms having multiple degrees of freedom. The invention facilitates connecting a tow vehicle to a trailer even when the trailer coupler and the ball of the tow vehicle are misaligned in one or more directions.

One embodiment of the trailer coupling mechanism includes a first end, a second end, a height adjustment assembly, a first swivel assembly, and a second swivel assembly. The first end is adapted to couple to one of a trailer and a vehicle. The second end is adapted to couple to the other of the trailer and the vehicle. The height adjustment assembly is coupled between the first end and the second end and is operative to adjust the relative height between the first end and the second end. The first swivel assembly is coupled between the height adjustment assembly and the first end to facilitate rotation of the first end with respect to the height adjustment assembly about a first axis. The second swivel assembly is coupled between the second end and the height adjustment assembly to facilitate rotation of the height adjustment assembly with respect to the second end about a second axis parallel to the first axis.

In a particular embodiment, the height adjustment assembly includes a first frame structure and a second frame structure. The first frame structure is coupled to the first swivel assembly, the second frame structure is coupled to the second swivel assembly, and the first frame structure is adjustably coupled to the second frame structure. In a more particular embodiment, the height adjustment assembly further includes a first pin and a second pin, the first frame structure includes a first aperture adapted to receive the first pin and a second aperture adapted to receive the second pin, and the second frame structure includes a set of sidewalls disposed on opposite sides of the first frame structure. Each of the sidewalls includes a vertical column of apertures and a vertical channel extending parallel with respect to the vertical column of apertures. The vertical column of apertures of each sidewall is adapted to receive the first pin, and the channel of each sidewall is adapted to receive the second pin.

In an even more particular embodiment, the vertical column of apertures of each sidewall includes a first end aperture and an opposite second end aperture, where the distance between the first end aperture and the second axis is less than the distance between the second end aperture and the second axis.

In another even more particular embodiment, each of the sidewalls further includes a stow position aperture vertically aligned with the channel, and the stow position aperture of each sidewall is coaxially aligned with the stow position aperture of each of the others of the sidewalls. Additionally, the first pin is configured to simultaneously engage the stow position aperture of each of the sidewalls such that the first axis and the second axis are perpendicular to one another when the first pin is disposed in the stowed position apertures.

In yet another even more particular embodiment, the trailer coupling mechanism further includes a length adjustment structure coupled between the first swivel assembly and the first frame structure. The length adjustment structure facilitates the adjustment in distance between the first swivel assembly and the first frame structure. In one exemplary embodiment, the length adjustment structure is slidably disposed in the first frame structure and includes a plurality of side apertures aligned in a row, where each of the side apertures is adapted to receive the first pin. In a more particular example embodiment, the length adjustment structure further includes a top channel and an opposite bottom channel having a shaft slidably disposed therethrough to prevent the length adjustment structure from being removed from the first frame structure. Additionally, the first frame structure further includes a top aperture and an opposite coaxially aligned bottom aperture, where the shaft of the length adjustment structure is simultaneously disposed in the top aperture and the bottom aperture of the first frame structure.

According to some particular embodiments, the trailer coupling mechanism further includes a horizontal pivot assembly coupled between the second swivel assembly and the second end. The horizontal pivot assembly facilitates horizontal rotation of the height adjustment assembly with respect to the second end about a third axis that is perpendicular to the second axis. In a more particular embodiment, the horizontal pivot assembly includes a locking feature operative to prevent horizontal rotation of the height adjustment assembly with respect to the second end when the first axis and the second axis are parallel to one another. In a still more particular embodiment, the locking feature is adapted to automatically lock responsive to a tensile (pulling) force asserted on the horizontal pivot assembly.

In yet another particular embodiment, the first swivel assembly further includes a first locking mechanism operative to lock the first end in a first position about the first axis with respect to the height adjustment assembly. The first locking mechanism of the first swivel assembly is operative to lock the first end in a second position about the first axis with respect to the height adjustment assembly, where the second position is located 180 degrees about the first axis from the first position. The second swivel assembly further includes a second locking mechanism operative to lock the height adjustment assembly in a first position about the second axis with respect to the second end. The second locking mechanism of the second swivel assembly is operative to lock the height adjustment assembly in a second position about the second axis with respect to the second end, where the second position of the second swivel assembly is located 180 degrees about the second axis from the first position of the second swivel assembly. In a more particular embodiment, at least one of the first locking mechanism and the second locking mechanism includes a spring pin.

In another particular embodiment, the first end includes a tow ball and the second end is adapted to be received by a tow hitch receiver.

In one embodiment, the first end includes a ball coupler and the second end is adapted to be coupled to a trailer tongue.

In another embodiment, the first end includes a ball coupler, and the second end comprises a trailer tongue.

A trailer having a trailer coupling mechanism according to the invention is also disclosed. The trailer coupling mechanism includes a first end, a second end, a height adjustment assembly, a first swivel assembly, and a second swivel assembly. The first end is adapted to couple to a ball coupler. The second end is coupled to a tongue of the trailer. The height adjustment assembly is coupled between the first end and the second end and is operative to adjust the relative height between the first end and the second end. The first swivel assembly is coupled between the height adjustment assembly and the first end to facilitate rotation of the first end with respect to the height adjustment assembly about a first axis. The second swivel assembly is coupled between the second end and the height adjustment assembly to facilitate rotation of the height adjustment assembly with respect to the second end about a second axis parallel to the first axis. In a particular embodiment, the trailer coupling mechanism further includes a horizontal pivot assembly coupled between the second swivel assembly and the second end.

Another exemplary trailer coupling mechanism according to the invention includes a first end adapted to couple to one of a trailer and a vehicle, a second end adapted to couple to the other of the trailer and the vehicle, a height adjustment assembly coupled between the first end and the second end and operative to adjust the relative height between the first end and the second end, means for rotating the first end with respect to the height adjustment assembly about a first axis, and means for rotating the height adjustment assembly with respect to the second end about a second axis that is parallel to the first axis.

BRIEF DESCRIPTION OF THE DRAWINGS

The present invention is described with reference to the following drawings, wherein like reference numbers denote substantially similar elements:

FIGS. 18A-18B are side views illustrating the length adjustment features of the trailer coupling mechanism of FIG. 10;

DETAILED DESCRIPTION

The present invention overcomes the problems associated with the prior art, by providing a trailer coupling mechanisms, including a ball mount or ball coupler, having multiple degrees of freedom. In the following description, numerous specific details are set forth (e.g., ball types, spring pin latches, etc.) in order to provide a thorough understanding of the invention. Those skilled in the art will recognize, however, that the invention may be practiced apart from these specific details. In other instances, details of well-known hitch and trailer manufacturing practices (e.g., routine optimization, metal shaping, welding, etc.) and components have been omitted, so as not to unnecessarily obscure the present invention.

Figure 1:
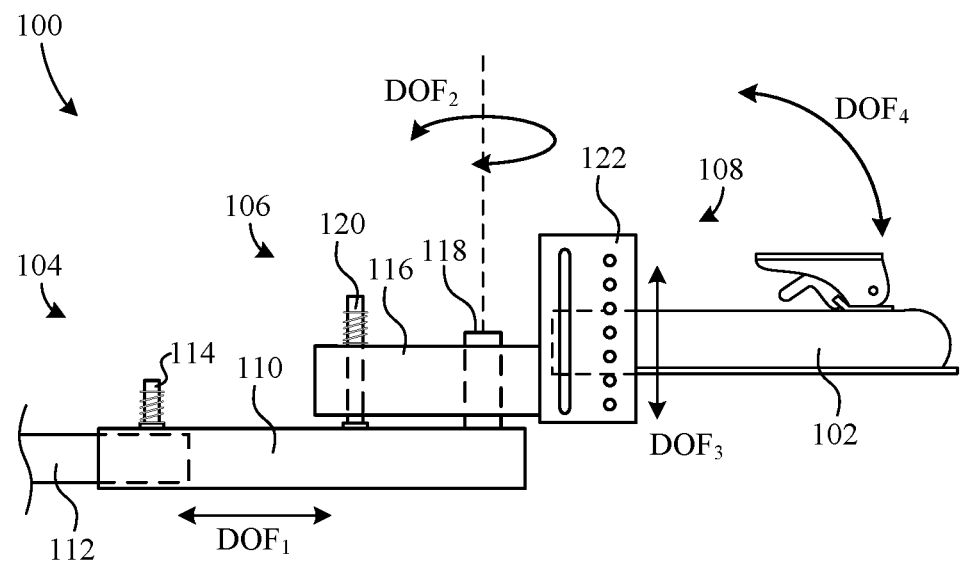
FIG. 1 is a side view of an adjustable trailer coupling mechanism according to one embodiment of the present invention.

FIG. 1 shows a side view of a trailer coupling mechanism 100 of a trailer (not shown) according to one embodiment of the present invention. Trailer coupling mechanism 100 comprises an adjustable trailer tongue assembly that facilitates connecting a ball coupler 102 of the assembly to a hitch ball (not shown) of a tow vehicle. Unlike traditional trailer tongues, trailer coupling mechanism 100 is adapted to engage hitch balls that may be misaligned with respect to ball coupler 102. This is achieved by incorporating multiple degrees of freedom into coupling mechanism 100. The first degree of freedom ($DOF_1$) is achieved via a horizontal slider assembly 104. The second degree of freedom ($DOF_2$) is achieved via a horizontal pivoting assembly 106. The third degree of freedom ($DOF_3$) is achieved via a vertical height adjustment assembly 108, which also enables ball coupler 102 to pivot vertically to add a fourth degree of freedom ($DOF_4$).

Horizontal slider assembly 104 includes a frame tube 110 slidably coupled to a frame member 112 of the trailer. Assembly 104 further includes a locking mechanism 114 fixably mounted to frame tube 110. When locking mechanism 114 is pulled upward, locking mechanism 114 disengages frame member 112 and mechanism 100, including ball coupler 102, is free to move toward or away from frame member 112.

Horizontal pivoting assembly 106 includes a pivoting member 116 pivotally coupled to frame tube 110 of horizontal slider assembly 104 via a hinge shaft 118. Assembly 106 further includes a locking mechanism 120 fixably mounted to pivoting member 116. When locking mechanism 120 is pulled upward, locking mechanism 120 disengages tube 110 and assembly 106 is free to pivot about shaft 118. This allows ball coupler 102 to be pivoted toward a hitch ball that is not horizontally aligned with respect to ball coupler 102.

Vertical height adjustment assembly 108 includes a variable height frame 122 fixably mounted to pivoting member 116. Ball coupler 102 is adjustably mounted to frame 122 such that the vertical height of coupler 102 can be changed with respect to member 116 by removing a pin (not shown) from a column of apertures formed through frame 122, adjusting the height of coupler 102 to a desired level, and then placing the pin back into a corresponding aperture of the column of apertures. Not only can the vertical height be adjusted, but ball coupler 102 can also be pivoted upward so that ball coupler 102 can thereafter be pivoted downward and positioned over the ball of the tow vehicle. This is accomplished by removing the pin disposed in the column of apertures while leaving a second pin disposed in the vertical channel that is parallel to the column of apertures.

Locking mechanisms 114 and 120 provide a beneficial aspect of the invention. That is, once ball coupler 102 is coupled to the ball, locking mechanisms 114 and 120 can be engaged simply by pulling the tow vehicle straight forward. The pulling (tensile) force is sufficient to cause coupling mechanism 100 to straighten out, thus causing locking mechanisms 114 and 120 to realign and engage (lock) with complimentary apertures formed in frame member 112 and frame tube 110, respectively.

Figure 2:
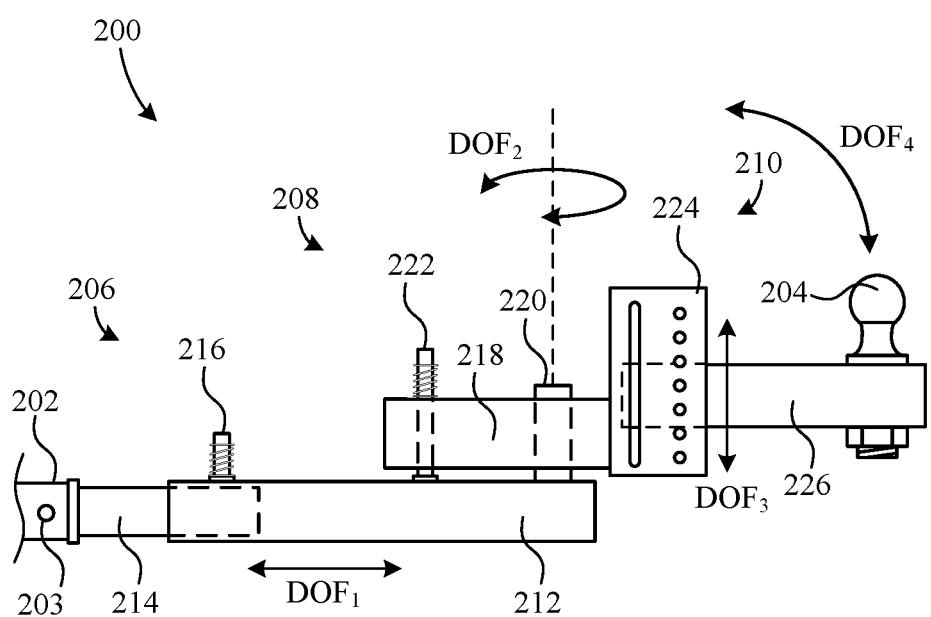
FIG. 2 is a side view of an adjustable trailer coupling mechanism according to another embodiment of the present invention.

FIG. 2 shows a side view of a trailer coupling mechanism 200 (an adjustable hitch assembly) according to another embodiment of the present invention. Coupling mechanism 200 is adapted to be mounted in a conventional hitch receiver 202 of a towing vehicle via a hitch pin (not shown) inserted through an aperture 203 formed through the hitch receiver 202.

Coupling mechanism 200 facilitates mating a hitch ball 204 to a ball coupler of a trailer (not shown). Unlike traditional hitch assemblies, coupling mechanism 200 is adapted to engage a ball coupler that may be misaligned with respect to ball 204. This is achieved by incorporating multiple degrees of freedom into coupling mechanism 200. The first degree of freedom ($DOF_1$) is achieved via a horizontal slider assembly 206. The second degree of freedom ($DOF_2$) is achieved via a horizontal pivoting assembly 208. The third degree of freedom ($DOF_3$) is achieved via a vertical height adjustment assembly 210, which also enables ball 204 to pivot vertically to add a fourth degree of freedom ($DOF_4$).

Horizontal slider assembly 206 includes a frame tube 212 slidably coupled to a hitch tube 214. Hitch tube 214 is configured to be mounted (inserted) in receiver 202, and includes at least one aperture (not shown) configured to align with aperture 203 and receive a hitch pin therethrough, thereby locking coupling mechanism 200 to the hitch receiver 202 of the tow vehicle. Assembly 206 further includes a locking mechanism 216 fixably mounted to frame tube 212. When locking mechanism 216 is pulled upward, locking mechanism 216 disengages from hitch tube 214, and coupling mechanism 200 is free to move toward or away from hitch receiver 202.

Horizontal pivoting assembly 208 includes a pivoting member 218 pivotally coupled to frame tube 212 of horizontal slider assembly 206 via a hinge shaft 220. Assembly 208 further includes a locking mechanism 222 fixably mounted to pivoting member 218. When locking mechanism 222 is pulled upward, locking mechanism 222 disengages tube 212 and assembly 208 is free to pivot about hinge shaft 220.

Vertical height adjustment assembly 210 includes a variable height frame 224 fixably mounted to pivoting member 218. Ball 204 is mounted on a frame member 226, which is adjustably mounted to frame 224. The vertical height of ball 204 can be changed with respect to member 218 (and, therefore, hitch receiver 202) by removing a pin (not shown) from a column of apertures formed in frame 224, adjusting the height of frame member 226 and ball 204 to the desired level, and then placing the pin back into a corresponding aperture of the column of apertures. Moreover, not only can the vertical height of ball 204 be adjusted, but ball 204 can also be pivoted upward and downward so ball 204 can engage a ball coupler that is not vertically aligned with ball 204. This is accomplished by removing the pin disposed in the column of apertures while leaving a second pin disposed in the vertical channel that is parallel to the column of apertures.

Locking mechanisms 216 and 222 facilitate a beneficial aspect of the invention. That is, once ball 204 is coupled to the ball coupler of the trailer, locking mechanisms 216 and 222 can be engaged simply by pulling the vehicle straight forward. The pulling (tensile) force is sufficient to cause coupling mechanism 200 to straighten out, thus causing locking mechanisms 216 and 222 to realign with, and automatically lock into, complimentary apertures formed in hitch tube 214 and frame tube 212, respectively.

Figure 3:
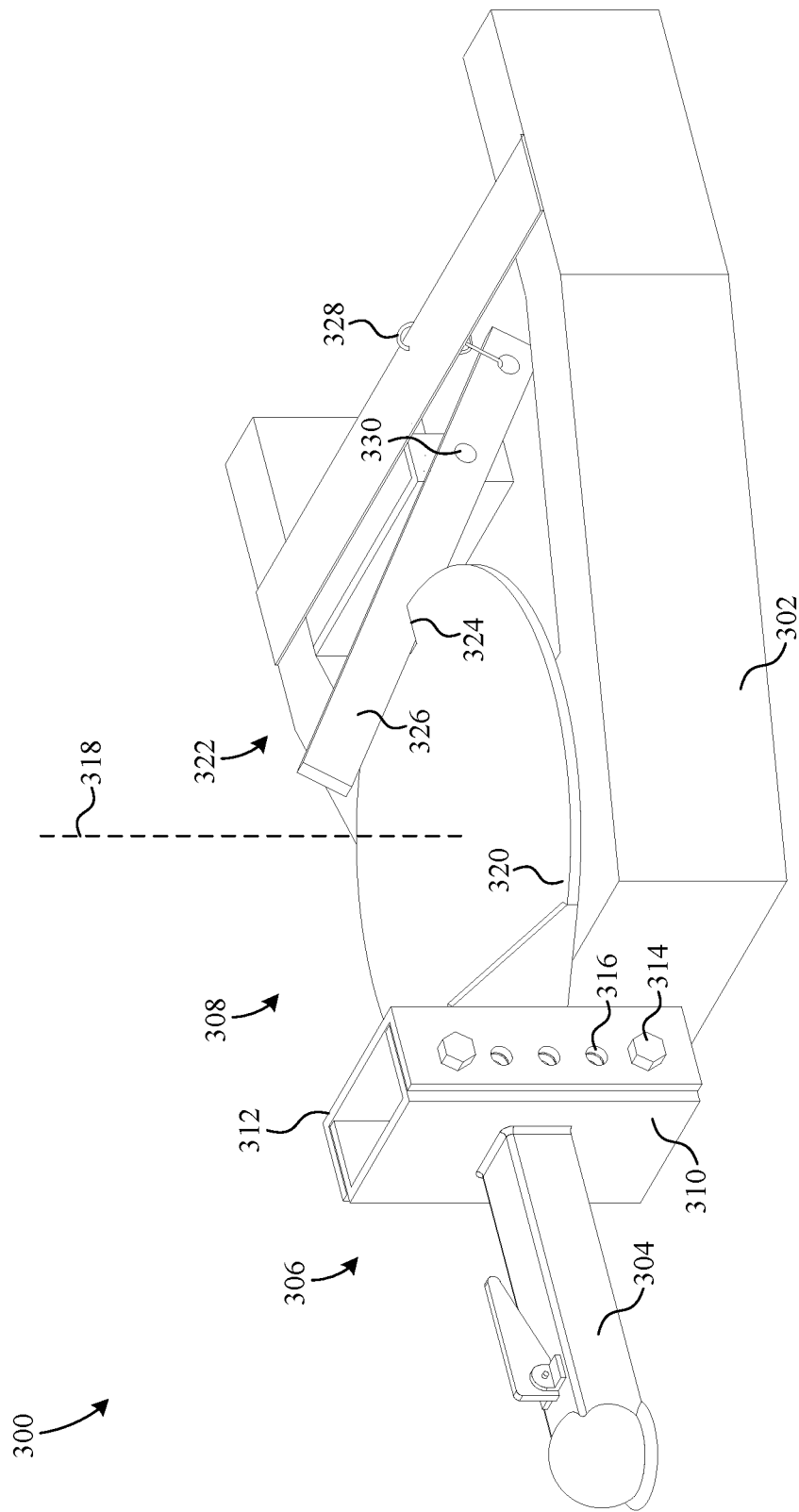
FIG. 3 is a perspective view of a trailer coupling mechanism according to another embodiment of the present invention.

FIG. 3 is a perspective view of a trailer coupling mechanism 300 according to another embodiment of the present invention. In this embodiment, trailer coupling mechanism 300 comprises a trailer tongue assembly integrated with a trailer (not shown). Coupling mechanism 300 facilitates the coupling of the associated trailer (not shown) to the ball of a towing vehicle that is not necessarily aligned vertically and horizontally with respect to the ball coupler of the trailer coupling mechanism 300. As shown, trailer coupling mechanism 300 includes a trailer tongue 302, a ball coupler 304, a height adjustment assembly 306, and a horizontal pivot assembly 308.

Height adjustment assembly 306 facilitates the vertical adjustment of coupler 304 with respect to tongue 302. Height adjustment assembly 306 includes an interior c-channel member 310 and a complimentary exterior c-channel member 312 coupled to one another via a set of bolts 314. The sidewalls of members 310 and 312 each include a column of apertures 316 adapted to receive bolts 314 therethrough. The height of coupler 304 is changed by first removing bolts 314, adjusting the height of member 310 with respect to member 312, and then reinserting bolts 314 into suitable apertures 316.

Horizontal pivot assembly 308 facilitates the horizontal rotation of coupler 304 about an axis 318 so as to accommodate for horizontal misalignment of coupler 304 with respect to a hitch ball. Horizontal pivot assembly 308 includes a disc-shaped plate 320 and a lever assembly 322. Plate 320 is pivotally mounted to tongue 302 such that it is rotatable about axis 318 when lever assembly 322 is disengaged. The front end of plate 320 is fixed to member 312 by, for example, welding. The back end of plate 320 includes a notch 324 that it adapted to receive a lever 326 of lever assembly 322.

Lever assembly 322 retains plate 320 in a fixed position with respect to tongue 302 when lever 326 is seated in notch 324. Lever assembly 322 includes lever 326 and a return spring 328. Lever 326 is pivotally mounted to tongue 302 via a hinge structure 330. To permit rotation of plate 320 about axis 318, lever 326 is disengaged from notch 324 by pulling lever 326 upward. As lever 326 is pulled upward, spring 328 provides an opposite force urging lever 326 to engage plate 320 when not being lifted. This provides a beneficial aspect of trailer coupling mechanism 300 in that lever 326 will automatically engage notch 324 when the two are aligned. This is illustrated in upcoming FIGS. 4A and 4B.

Figure 4B:
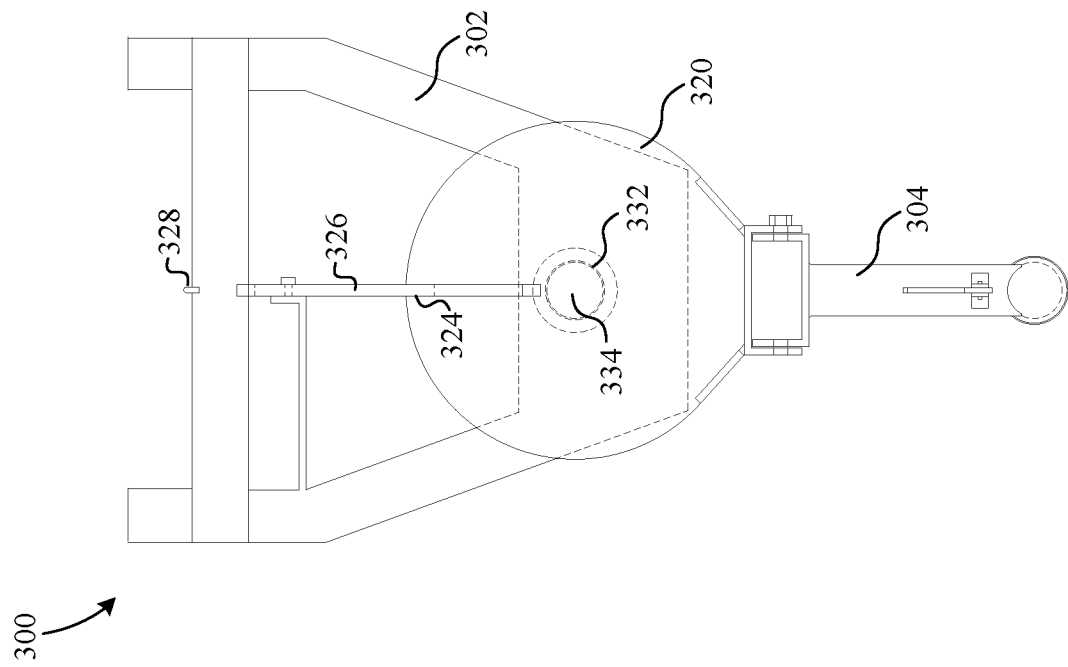
FIG. 4B is a top view of the trailer coupling mechanism of FIG. 3 in a locked position.
Figure 4A:
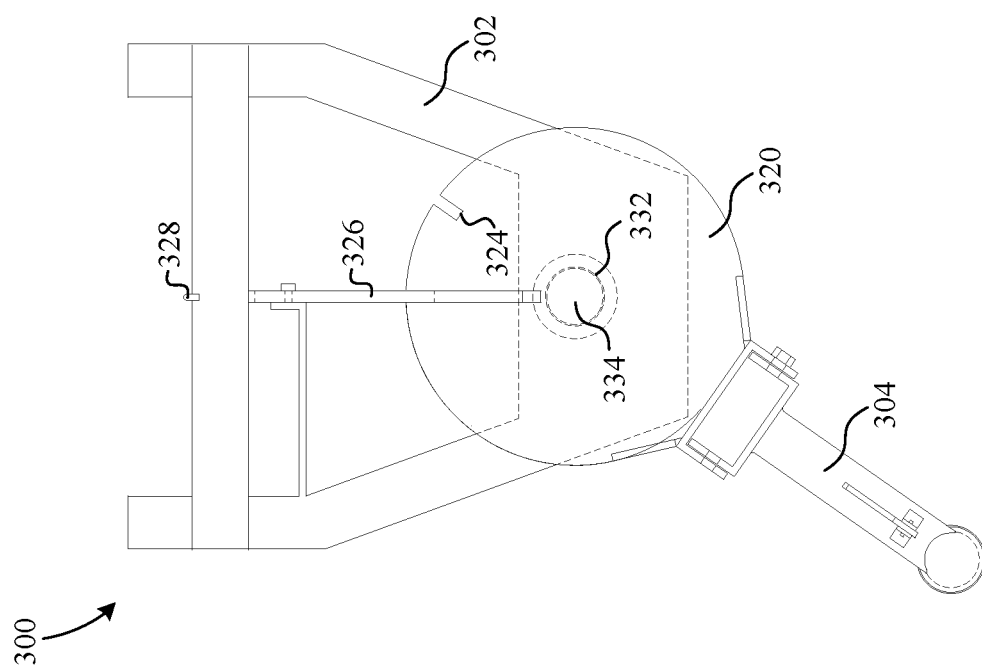
FIG. 4A is a top view of the trailer coupling mechanism of FIG. 3 in a movable position.

FIGS. 4A and 4B show top views of trailer coupling mechanism 300 in a rotated position and a locked position, respectively. As shown in FIG. 4A, lever 326 is disengaged from notch 324 such that plate 320 is free to rotate. When lever 326 is disengaged from notch 324, a force from spring 328 urges lever 326 against the outside perimeter of plate 320, whereby plate 320 slides against lever 326 as plate 320 rotates. When coupler 304 is hooked to a ball and pulled forward by the tow vehicle, as shown in FIG. 4B, plate 320 rotates and notch 324 realigns with lever 326. Once realigned, spring 328 causes lever 326 to automatically engage notch 324, thereby preventing any further rotation of plate 320 until lever 326 is lifted again.

FIG. 4A and FIG. 4B also show that tongue 302 defines an aperture 332 (e.g., a tube, etc.), which receives a pivot shaft 334 (e.g., a tube of smaller diameter, etc.) therein. Pivot shaft 334 is fixed to plate 320 (e.g., by welding) and enables plate 320 to rotate about axis 318. Pivot shaft 334 can also include a feature (e.g., a retainer clip near its bottom end, etc.) to retain pivot shaft 334 within aperture 332.

Figure 5:
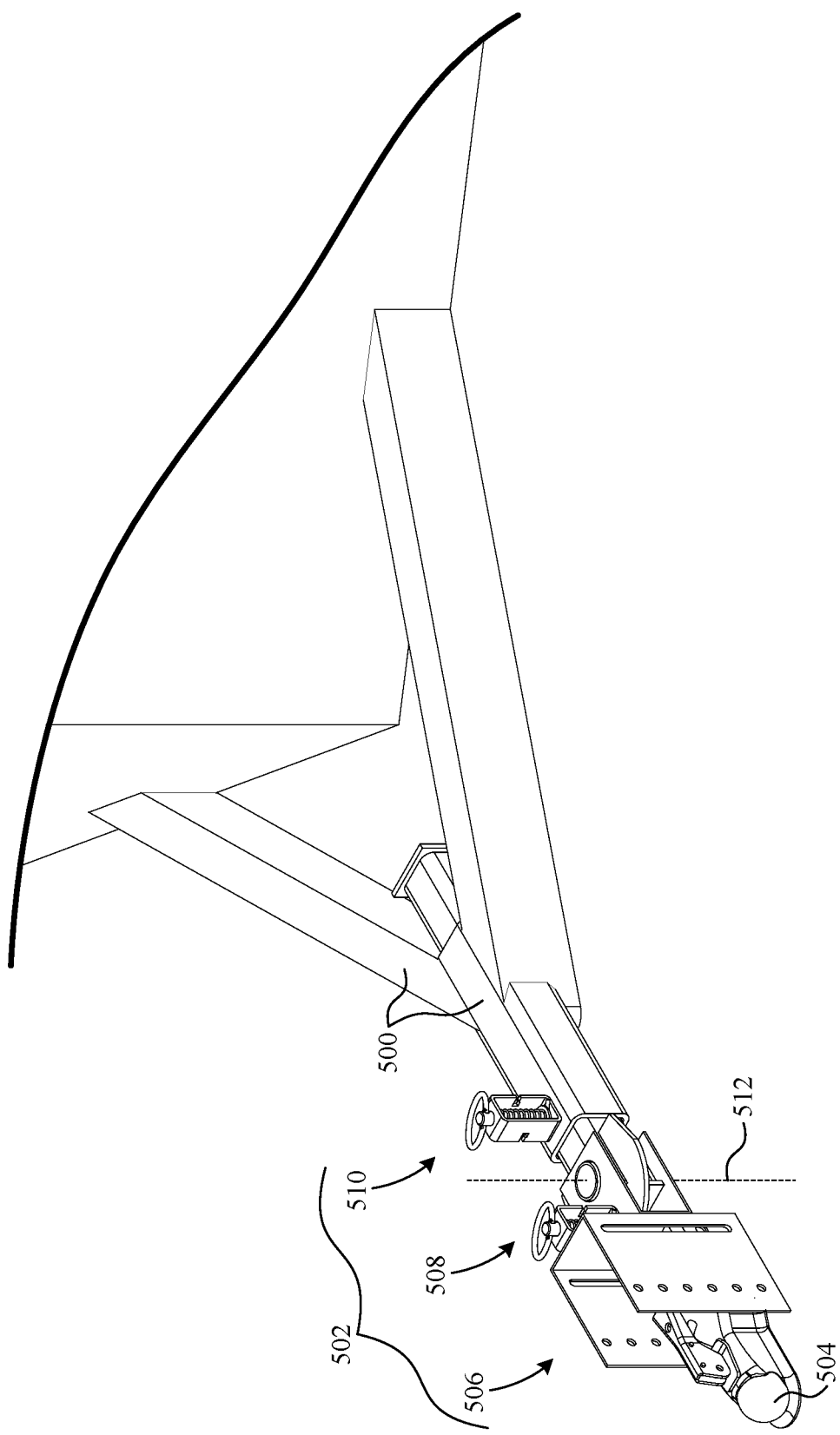
FIG. 5 is a perspective view of a trailer tongue with an adjustable trailer coupling mechanism according to another embodiment of the present invention.

FIG. 5 shows a perspective view of a trailer tongue 500 having an adjustable trailer coupling mechanism 502, which facilitates adjusting the position of a ball coupler 504 with respect to trailer tongue 500. Coupling mechanism 502 enables the position of ball coupler 504 to be adjusted with respect to a misaligned ball on the hitch of a tow vehicle. Trailer coupling mechanism 502 includes a vertical height adjustment assembly 506, a horizontal pivoting assembly 508, and a horizontal slider assembly 510. Vertical height adjustment assembly 506 facilitates the vertical height adjustment of ball coupler 504 with respect to tongue 500. Horizontal pivoting assembly 508 facilitates the horizontal rotation of ball coupler 504 about an axis 512. Horizontal slider assembly 510 facilitates the horizontal length adjustment of ball coupler 504 with respect to (toward and away from) trailer tongue 500.

Figure 6:
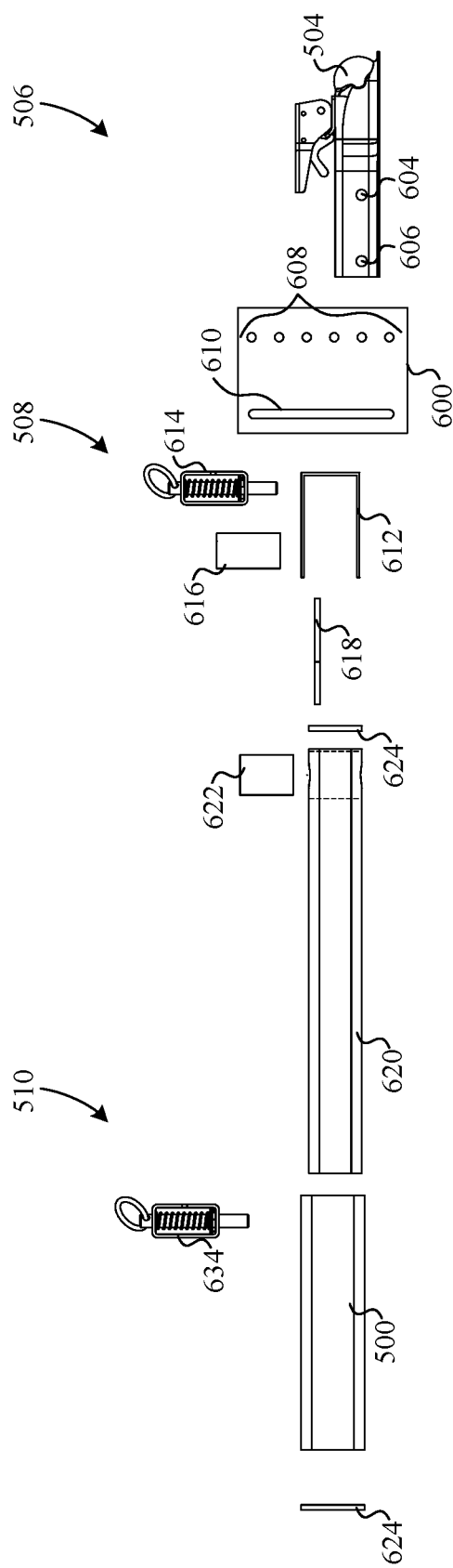
FIG. 6 is an exploded side view of the trailer coupling mechanism of FIG. 5.
Figure 7:
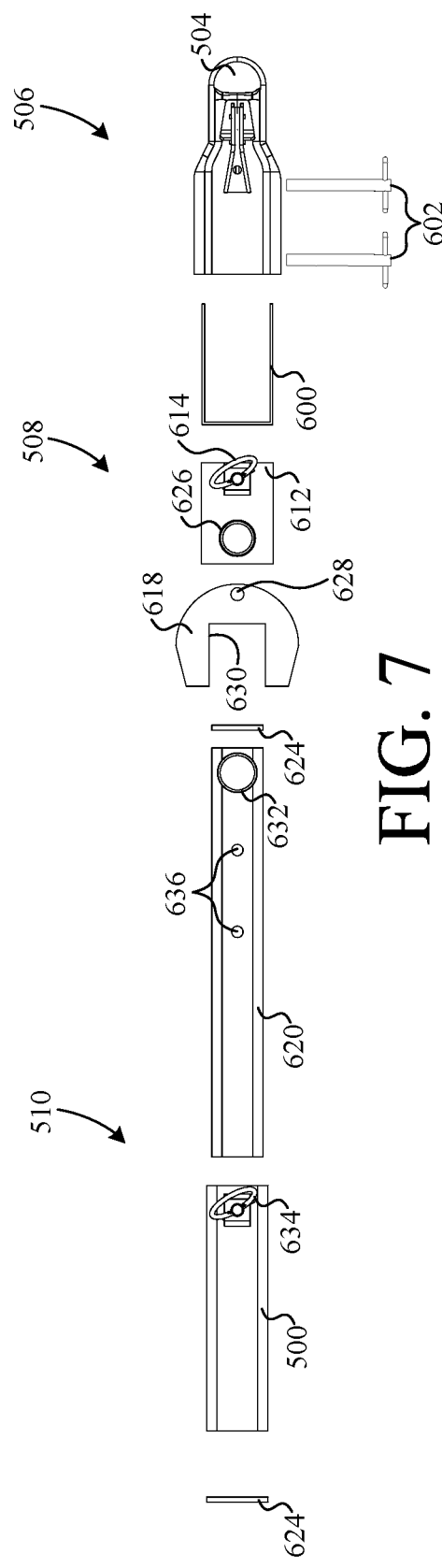
FIG. 7 is an exploded top view of the trailer coupling mechanism of FIG. 5.

FIG. 6 and FIG. 7 show an exploded side view and an exploded top view, respectively, of adjustable trailer coupling mechanism 502 and trailer tongue 500.

Vertical height adjustment assembly 506 includes ball coupler 504, a height adjustment structure 600, and a set of retaining pins 602. Ball coupler 504 is adapted to receive a hitch ball and includes a front aperture 604 and a rear aperture 606, each adapted to receive one of pins 602. Height adjustment structure 600 is adapted to support ball coupler 504 at various heights. Height adjustment structure 600 includes a vertical column of apertures 608 and a corresponding vertical channel 610. Depending on the desired height of ball coupler 504, front aperture 604 of coupler 504 is coaxially aligned with one of apertures 608 such that both simultaneously receive one of pins 602. The other of pins 602 is simultaneously disposed through channel 610 and rear aperture 606 such that it is fixed with respect to coupler 504 but slidably disposed in channel 610.

Horizontal pivoting assembly 508 includes a C-bracket 612, a spring pin 614, an inner hinge tube 616, a locking plate 618, a slider tube 620, an outer hinge tube 622, and a set of end caps 624. C-bracket 612 is fixed to the back of height adjustment structure 600 by, for example, welding. Furthermore, C-bracket 612 includes a first aperture 626, a second aperture (not visible), and a third aperture (not visible) formed therein. First aperture 626 and the second aperture are coaxially aligned and adapted to receive inner hinge tube 616 therein. The third aperture is formed adjacent aperture 626 and is adapted to receive the pin of spring pin 614 therein (see FIG. 8). Inner hinge tube 616 extends through the top and bottom of C-bracket 612 and is fixably mounted therein such that outer hinge tube 622 can rotate about inner hinge tube 616. Spring pin 614 is fixably mounted to the top of C-bracket 612. Locking plate 618 includes an aperture 628 and a cutout 630. Aperture 628 is configured to align with the third aperture formed in C-bracket 612 so as to receive the pin of spring pin 614, and cutout 630 is adapted to receive slider tube 620. Furthermore, slider tube 620 is seated in cutout 630 and fixed therein by, for example, welding. Slider tube 620 includes an aperture 632 through which outer hinge tube 622 is fixably mounted such that outer hinge tube 622 and, therefore, slider tube 620 rotate about inner hinge tube 616. End caps 624 (e.g., square plates) are fixed to opposite ends of slider tube 620, for example, by welding. As shown, the diameter of the end cap 624 mounted on the rear end of slider tube 620 is larger than the interior diameter of tongue 500 so as to prevent slider tube 620 from being pulled out of tongue 500.

Horizontal slider assembly 510 includes a portion of trailer tongue 500 and a spring pin 634. Trailer tongue 500 includes a generally square tube having in an inner space adapted to slidably receive slider tube 620. Spring pin 634 is fixably mounted to the top of trailer tongue 500 to adjustably fix the position of slider tube 620 with respect to tongue 500. That is, spring pin 634 is fixed over an aperture (not visible) formed through the top of tongue 500 such that spring pin 634 can engage one of a set of apertures 636 formed through the top surface of slider tube 620. This allows a user to change the length of coupler mechanism 502 by first lifting spring pin 634 and then sliding slider tube 620 to a desired position until spring pin 634 re-engages an appropriate one of the plurality of apertures 636 and, therefore, locks slider tube 620 into an appropriate operating position.

Figure 8:
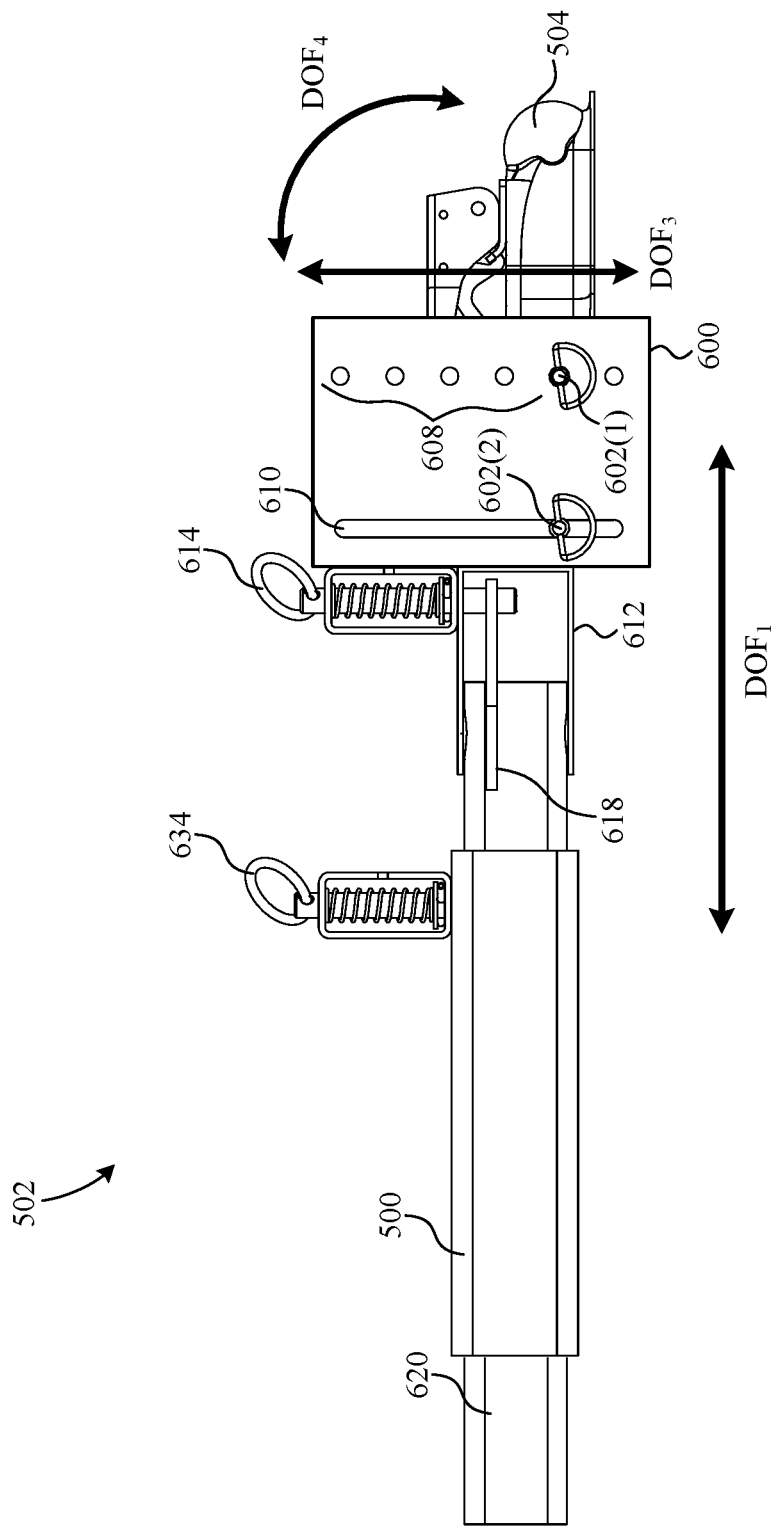
FIG. 8 is an assembled side view of the trailer coupling mechanism of FIG. 5.

FIG. 8 shows a side view of coupling mechanism 502 illustrating three degrees of freedom. As shown, ball coupler 504 can be pivoted ($DOF_4$) about pin 602(2) seated in channel 610 by first removing pin 602(1) from apertures 608. This provides a convenient way to position ball coupler 504 over a hitch ball by allowing it to be tilted back and then over the hitch ball. The fixed elevation of ball coupler 504 can also be changed ($DOF_3$) when pin 602(1) is removed from apertures 608. Once the front pin 602(1) is removed from apertures 608, the rear pin 602(2) is free to slide in channel 610. Of course, once the height of ball coupler 504 is positioned as desired with respect to height adjustment structure 600, pin 602(1) is re-inserted into one of apertures 608. The horizontal distance between ball coupler 504 and tongue 500 is also adjustable ($DOF_1$) by pulling upward on spring pin 634. This causes spring pin 634 to disengage slider tube 620, thereby allowing slider tube 620 to be pushed in, or pulled out, to a desired horizontal position.

Figure 9:
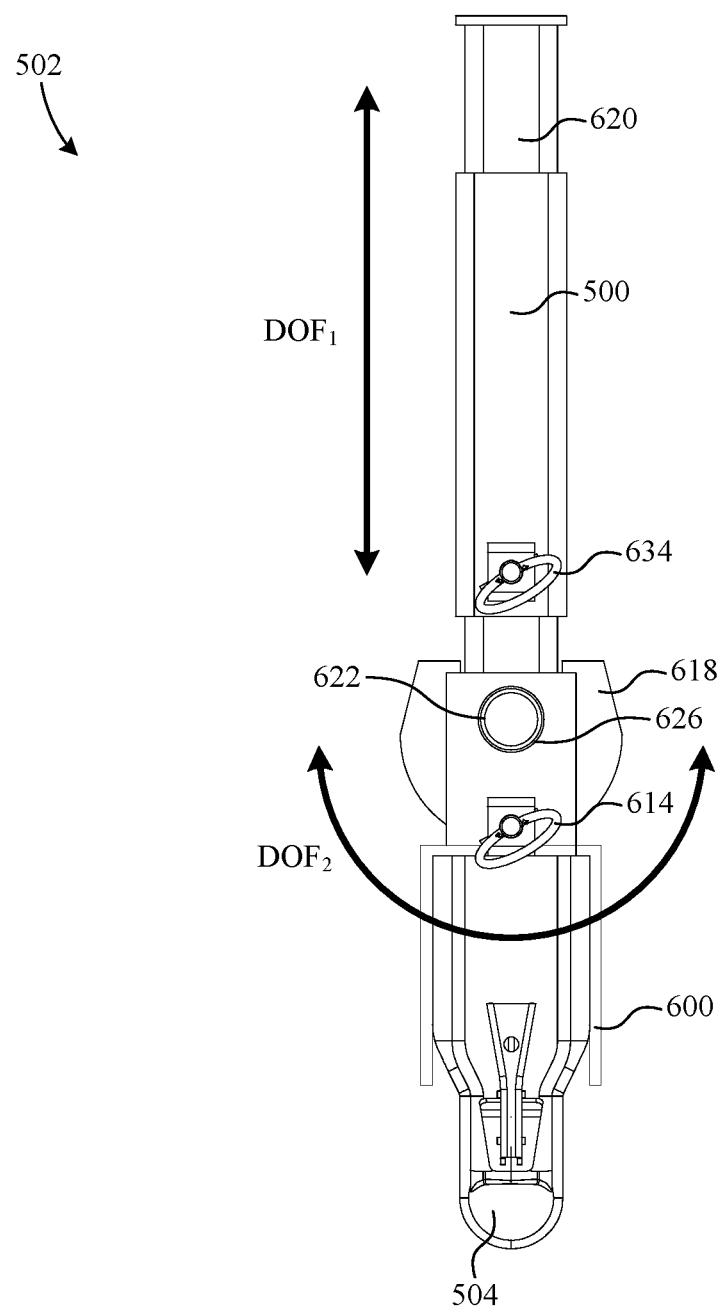
FIG. 9 is an assembled top view of the trailer coupling mechanism of FIG. 5.

FIG. 9 shows a top view of coupling mechanism 502 illustrating an additional degree of freedom ($DOF_2$). That is, ball coupler 504 and height adjustment structure 600 can be rotated about outer hinge tube 622. This is done by lifting upward on spring pin 614 until it disengages aperture 628 of locking plate 618. Once spring pin 614 is disengaged, ball coupler 504 and height adjustment structure 600 are free to rotate. When ball coupler 504 and height adjustment structure 600 are rotated, spring pin 614 slidably engages the top surface of locking plate 618. When ball coupler 504 is pulled forward by, for example, a hitch ball, aperture 628 realigns with spring pin 614 thereby causing spring pin 614 to snap back into aperture 628. Once spring pin 614 is snapped back into aperture 628, ball coupler 504 is locked in a straight position until spring pin 614 is lifted again.

Figure 10:
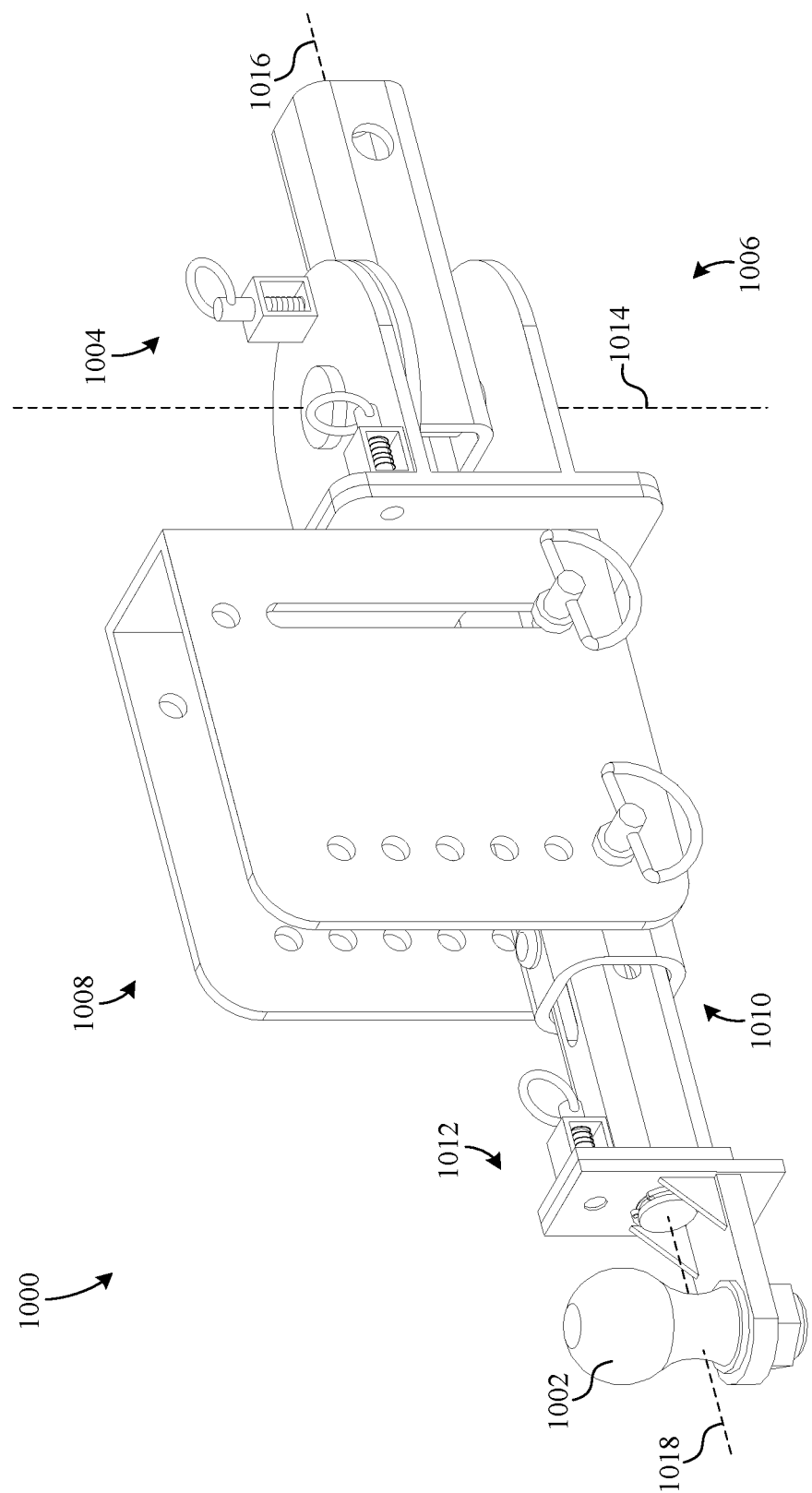
FIG. 10 is a perspective view of a trailer coupling mechanism according to another embodiment of the present invention.

FIG. 10 shows a perspective view of a trailer coupling mechanism 1000 according to another embodiment of the present invention. Trailer coupling mechanism 1000 is adapted to be mounted in the hitch receiver of a tow vehicle and facilitates the coupling of a tow ball 1002 to a trailer that is not necessarily aligned vertically and/or horizontally with respect to tow ball 1002.

Trailer coupling mechanism 1000 includes a horizontal pivot assembly 1004, a first swivel assembly 1006, a height adjustment assembly 1008, a length adjustment assembly 1010, and a second swivel assembly 1012. Horizontal pivot assembly 1004 facilitates the coupling of mechanism 1000 to the hitch receiver of a tow vehicle and also facilitates the horizontal pivoting of tow ball 1002 about an axis 1014. First swivel assembly 1006 is coupled between horizontal pivot assembly 1004 and height adjustment assembly 1008 and facilitates rotation therebetween about an axis 1016. Height adjustment assembly 1008 is coupled between first swivel assembly 1006 and length adjustment assembly 1010. Furthermore, height adjustment assembly 1008 enables the height of tow ball 1002 to be adjusted. Length adjustment assembly 1010 is coupled between height adjustment assembly 1008 and second swivel assembly 1012 and facilitates adjustment of the horizontal length of trailer coupling mechanism 1000. Second swivel assembly 1012 is pivotally coupled to length adjustment assembly 1010 to facilitate the rotation of tow ball 1002 about an axis 1018, which is parallel to axis 1016.

Figure 11:
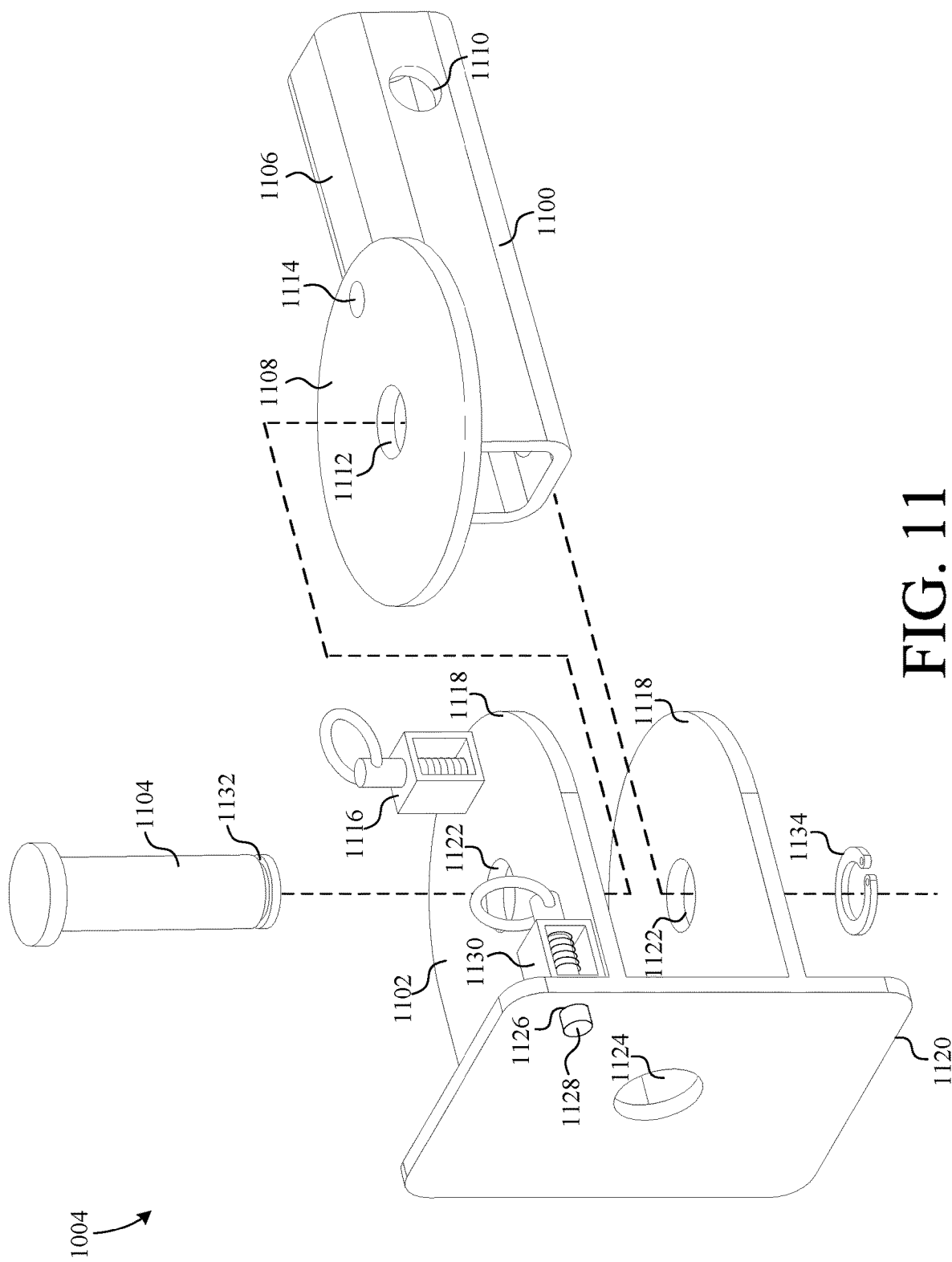
FIG. 11 is an exploded perspective view of the horizontal pivot assembly of the trailer coupling mechanism of FIG. 10.

FIG. 11 shows an exploded perspective view of horizontal pivot assembly 1004, which includes a hitch structure 1100 and a hinge structure 1102 that couple together via a hinge pin 1104.

Hitch structure 1100 includes a square tube 1106 and a disk-shaped plate 1108 fixed directly thereon. Square tube 1106 is adapted to be inserted into a hitch receiver and includes an aperture 1110 that is formed horizontally therethrough to secure square tube 1106 in the hitch receiver using a hitch pin (not shown). Plate 1108 is permanently fixed directly to the top of square tube 1106 and includes a first aperture 1112 and a second aperture 1114. First aperture 1112 passes completely through both square tube 1106 and plate 1108 and is adapted to receive hinge pin 1104 therein. Second aperture 1114 is adapted to receive the pin of a spring pin 1116, which is permanently fixed to the top of hinge structure 1102. In the example embodiment, hitch structure 1100 is formed from steel components that are welded to one another. For example, square tube 1106 is a section of steel square stock and plate 1108 is a round steel plate welded thereon.

Hinge structure 1102 includes a set of plates 1118 extending perpendicularly from a third plate 1120. Each plate 1118 includes an aperture 1122 that is adapted to receive hinge pin 1104. The top one of plates 1118 further includes an aperture (not shown) through which the pin of spring pin 1116 is disposed. Plate 1120 includes a first aperture 1124 and a second aperture 1126. First aperture 1124 facilitates the coupling of horizontal pivot assembly 1004 to first swivel assembly 1006 and second aperture 1126 is adapted to receive a pin 1128 of a spring pin 1130 therethrough.

When horizontal pivot assembly 1004 is assembled, hinge pin 1104 is disposed through apertures 1112 and 1122 such that hitch structure 1100 and a hinge structure 1102 are pivotally coupled together. Hinge pin 1104 includes a channel 1132 that is adapted to receive a retaining clip 1134, which retains hinge pin 1104 within the apertures 1112 and 1122 of hitch structure 1100 and hinge structure 1102, respectively.

Figure 12:
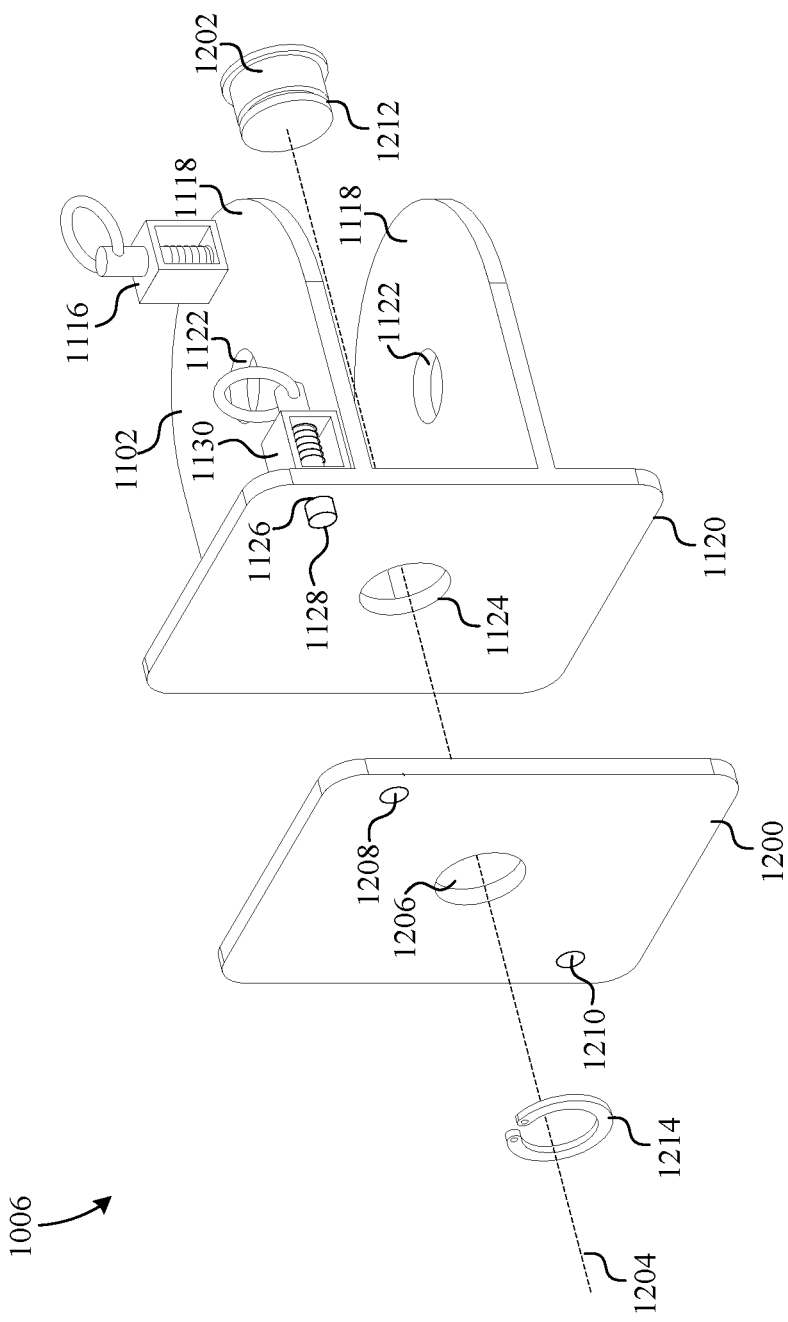
FIG. 12 is an exploded perspective view of one swivel assembly of the trailer coupling mechanism of FIG. 10.

FIG. 12 is an exploded perspective view of first swivel assembly 1006, which includes a plate 1200 and a swivel pin 1202 exploded along an axis 1204. Plate 1200 includes a first aperture 1206, a second aperture 1208, and a third aperture 1210. First aperture 1206 is adapted to receive swivel pin 1202. Apertures 1208 and 1210 are adapted to receive pin 1128 of spring pin 1130. When assembled, swivel pin 1202 is disposed through aperture 1124 of plate 1120 and through aperture 1206 of plate 1200 such that plates 1120 and 1200 are able to swivel about pin 1202. Swivel pin 1202 includes a channel 1212 that is adapted to receive a retaining clip 1214 therein, which secures swivel pin 1202 to plates 1120 and 1200 and maintains plates 1120 and 1200 in close formation.

Figure 13:
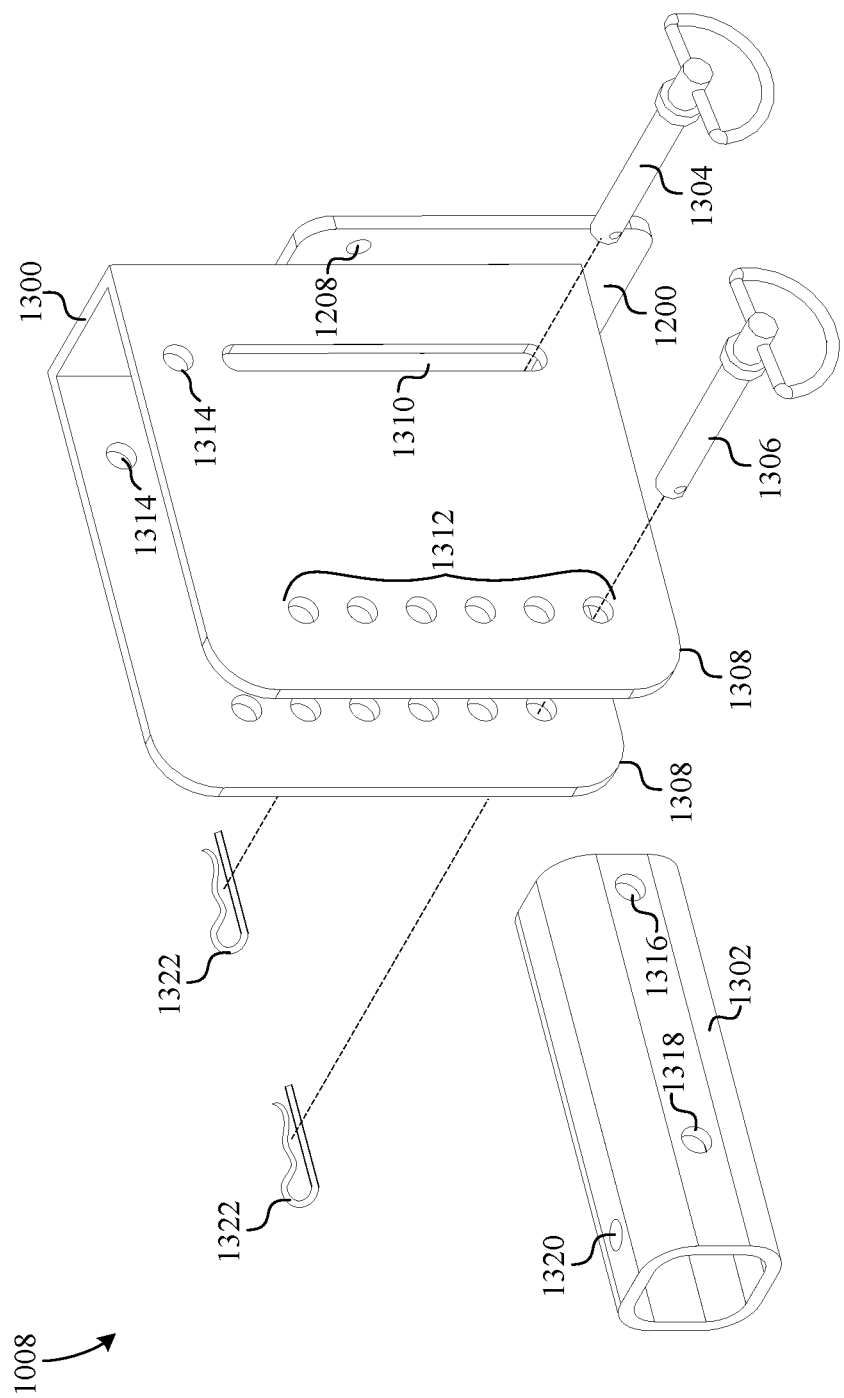
FIG. 13 is an exploded perspective view of the height adjustment assembly of the trailer coupling mechanism of FIG. 10.

FIG. 13 is an exploded perspective view of height adjustment assembly 1008, which includes a first frame structure 1300 and a second frame structure 1302 that couple to one another via a set of retaining pins 1304 and 1306.

First frame structure 1300 is a rigid steel structure permanently fixed to plate 1200 by, for example, a welded joint. First frame structure 1300 includes a set of sidewalls 1308, each having a vertical channel 1310, a vertical column of apertures 1312, and an aperture 1314. Sidewalls 1308 are adapted to receive second frame structure 1302 therebetween. Vertical channels 1310 are adapted to receive pin 1304 such that pin 1304 can slide up and down therein. The apertures in each vertical column of apertures 1312 is adapted to receive pin 1306. Aperture 1314 is also adapted to receive pin 1306. Retaining pins 1304 and 1306 are conventional pins that are removable via a respective set of cotter pins 1322.

Second frame structure 1302 is, for example, a section of steel square stock tube having a first aperture 1316, a second aperture 1318, and a third aperture 1320. First aperture 1316 and second aperture 1318 pass completely through frame structure 1302 and are adapted to receive pins 1304 and 1306, respectively. Aperture 1320 also passes completely through frame structure 1302 and will be described in more detail below.

Figure 14:
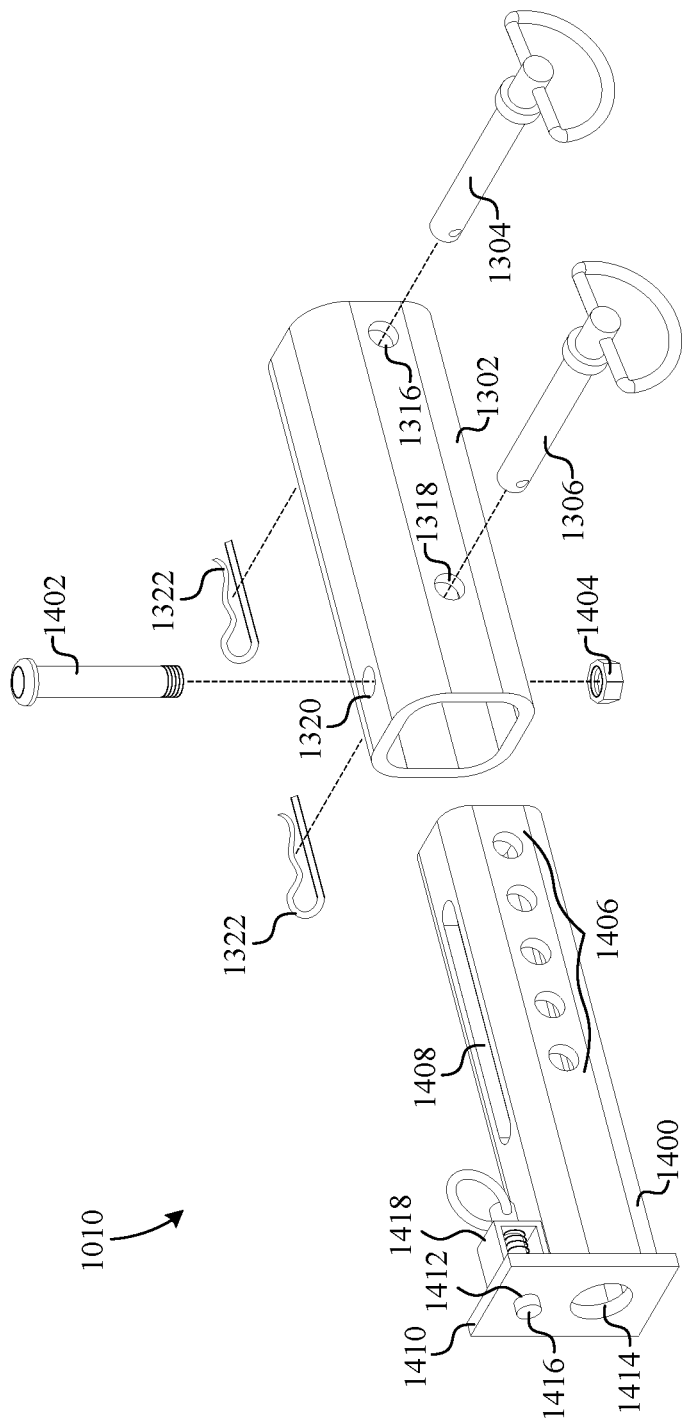
FIG. 14 is an exploded perspective view of the length adjustment assembly of the trailer coupling mechanism of FIG. 10.

FIG. 14 is an exploded perspective view of length adjustment assembly 1010, which includes a length adjustment structure 1400 that telescopes into frame structure 1302 and is coupled thereto via a bolt 1402 and nut 1404. Structure 1400 includes a horizontal row of apertures 1406, a horizontal channel 1408, and an end plate 1410. Horizontal row of apertures 1406 are adapted to engage pin 1306 such that the distance at which structure 1400 protrudes from frame structure 1302 can be selectively adjusted. Horizontal channel 1408 passes completely through structure 1400 and is adapted to slidably engage bolt 1402 when bolt 1402 is secured in aperture 1320 via nut 1404. End plate 1410 facilitates the coupling of length adjustment assembly 1010 to swivel assembly 1012 (described in upcoming FIG. 15), and includes a first aperture 1412 and a second aperture 1414. First aperture 1412 provides an opening through which a pin 1416 of a pin spring 1418 is slidably disposed. Aperture 1414 is described in further detail below.

Figure 15:
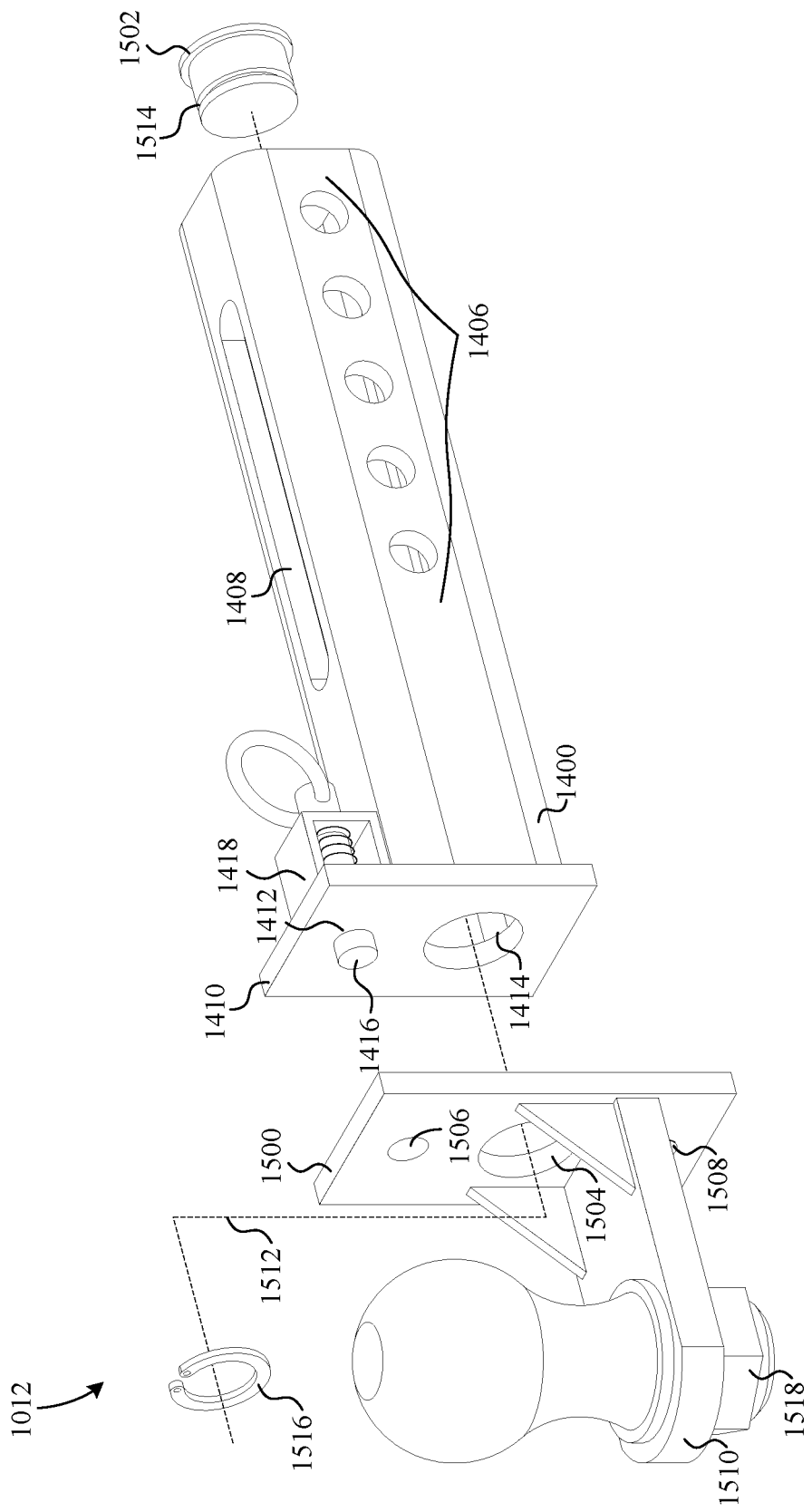
FIG. 15 is an exploded perspective view of another swivel assembly of the trailer coupling mechanism of FIG. 10.

FIG. 15 shows an exploded perspective view of swivel assembly 1012, which includes a plate 1500 rotatably coupled to plate 1410 of length adjustment assembly 1010 via a swivel pin 1502. Plate 1500 includes a first aperture 1504, a second aperture 1506, a third aperture 1508, and a ball mount platform 1510 extending generally perpendicularly from plate 1500. First aperture 1504 is adapted to be coaxially aligned with aperture 1414 and to receive swivel pin 1502 therethrough. Swivel pin 1502 includes a channel 1514 that is adapted to seat a retainer clip 1516, which is configured to abut plate 1500 and retain the plates 1410 and 1500 in close formation. Once swivel pin 1502 is installed, plate 1500 can rotate (swivel) relative to plate 1410 about an axis 1512 that passes coaxially through aperture 1414, aperture 1504, and swivel pin 1502. Furthermore, apertures 1506 and 1508 of plate 1500 are configured to receive pin 1416 of spring pin 1418 to lock plate 1500 in either of two positions located 180 degrees apart.

Platform 1510 is adapted to receive hitch ball 1002 as shown. Hitch ball 1002 is mounted to platform 1510 via a nut 1518 such that it can be removed and replaced by other hitch balls as desired. When pin 1416 engages aperture 1506, hitch ball 1002 is oriented as shown. However, when plate 1500 is rotated 180 degrees and pin 1416 engages aperture 1508, hitch ball 1002 will be inverted from the position shown.

Figure 16:
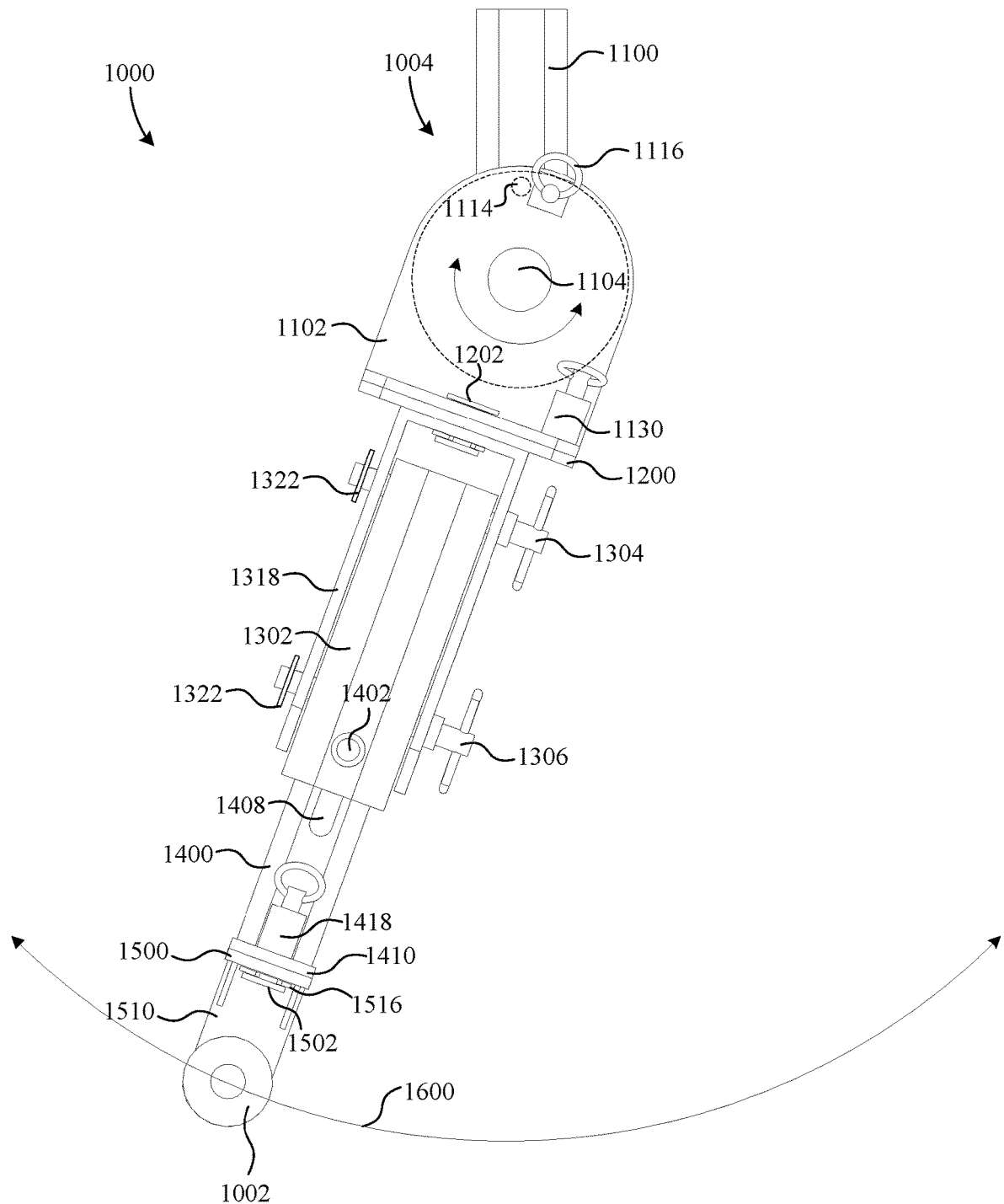
FIG. 16 is a top view of the trailer coupling mechanism of FIG. 10 illustrating the operation of the horizontal pivot assembly.

FIG. 16 shows a top view of trailer coupling mechanism 1000 during the actuation of horizontal pivot assembly 1004. The operation of horizontal pivot assembly 1004 is described as follows. First, spring pin 1116 is pulled upward, thereby retracting the pin of spring pin 1116 from aperture 1114 of plate 1108. Then, trailer coupling mechanism 1000 is free to pivot about pin 1104, thus giving the user the freedom to align ball 1002 with a ball coupler located anywhere along a circular path 1600. Once ball 1002 is connected to the ball coupler, the vehicle can be pulled forward, thus causing trailer coupling mechanism 1000 to straighten. The straightening of trailer coupling mechanism 1000 causes the pin of spring pin 1116 to realign with aperture 1114. Once aligned, the spring force of spring pin 1116 causes the pin of spring pin 1116 to automatically reseat itself into aperture 1114, thus locking hitch structure 1100 in a fixed position with respect to hinge structure 1102.

Figure 17A:
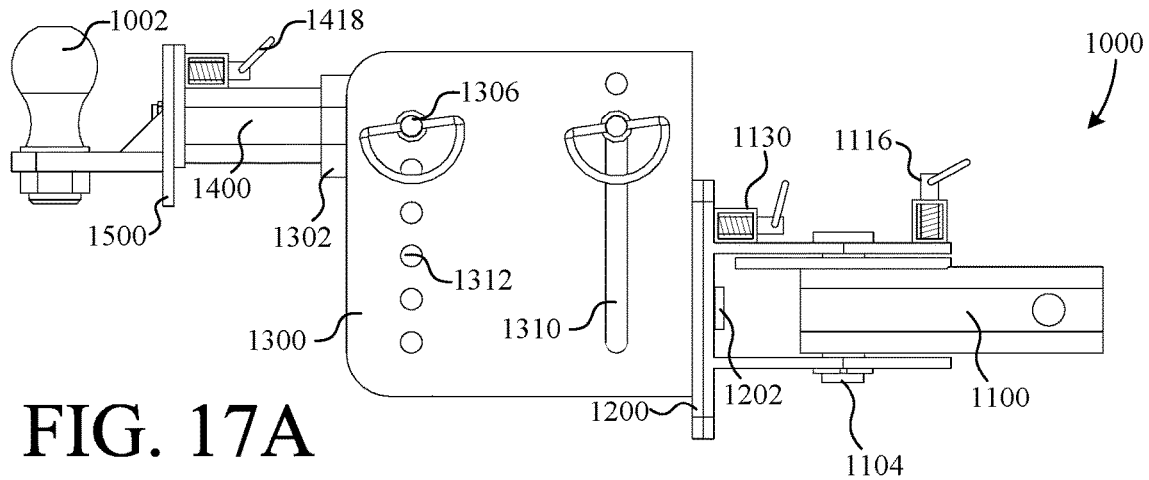
FIGS. 17A-17C are side views illustrating the vertical height adjustment features of the trailer coupling mechanism of FIG. 10.
Figure 17B:
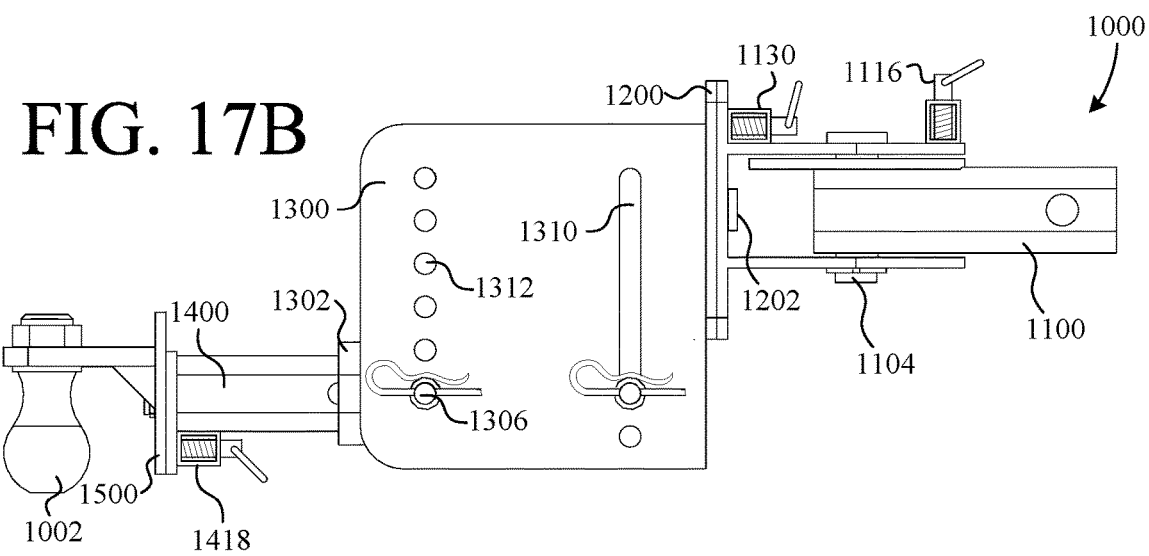
Figure 17C:
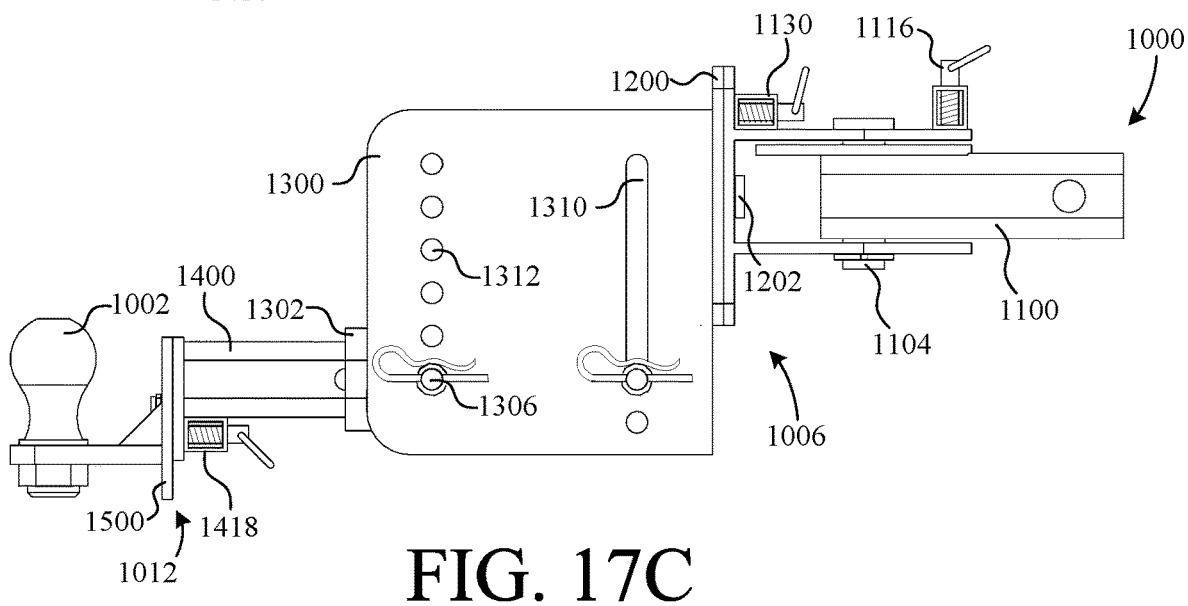

FIGS. 17A-17C illustrate the vertical adjustment of trailer coupling mechanism 1000. FIG. 17A shows trailer coupling mechanism 1000 in a towing position wherein ball 1002 is at the highest position with respect to hitch structure 1100. One approach to changing the height of ball 1002 with respect to hitch structure 1100 is to simply remove pin 1306 and slide frame structure 1302 downward to a desired one of apertures 1312 and then reinsert pin 1306.

Operating instructions for achieving a more extended vertical range is described as follows. First, the user pulls on spring pin 1130, thus disengaging pin 1128 of spring pin 1130 from aperture 1208 of plate 1200. With pin 1128 retracted from aperture 1208, plate 1200 is then rotated 180 degrees as shown in FIG. 17B. Once plate 1200 is rotated, pin 1128 of spring pin 1130 inserts itself into aperture 1210 of plate 1200, thus locking plate 1200 with respect to plate 1120. Then, the user pulls on spring pin 1418, thus retracting pin 1416 from aperture 1506. With pin 1416 retracted from aperture 1506, plate 1410 is then rotated 180 degrees as shown in FIG. 17C. Once plate 1500 is rotated, pin 1416 inserts itself into aperture 1508 of plate 1500, thereby changing the orientation of ball 1002 to an upright position. Indeed, swivel assemblies 1006 and 1012 enable trailer coupling mechanism 1000 to have a substantially long vertical range.

FIGS. 18A-18B illustrate the horizontal adjustment (overall length) of trailer coupling mechanism 1000. FIG. 18A shows trailer coupling mechanism 1000 in a towing position wherein ball 1002 is at the closest position with respect to frame structure 1302. FIG. 18B shows trailer coupling mechanism 1000 in a towing position wherein ball 1002 is at the furthest position with respect to frame structure 1302.

Operating instructions for changing the distance between ball 1002 and frame structure 1302 are described as follows. First, the user removes pin 1306 from the rest of trailer coupling mechanism 1000. Then, the user pulls structure 1400 outward from structure 1302 until the desired one of apertures 1312 is aligned with the desired one of apertures 1406 of structure 1400. Once aperture 1312 is aligned with the desired one of apertures 1406, the user reinserts pin 1306 through apertures 1312, 1318 (FIG. 13), and 1406. Finally, the user couples cotter pin 1322 to pin 1306 thereby securing it into place. Note that the distance at which structure 1400 can be pulled outward from structure 1302 is limited by bolt 1402 being seated in channel 1408 (FIG. 14).

Figure 19:
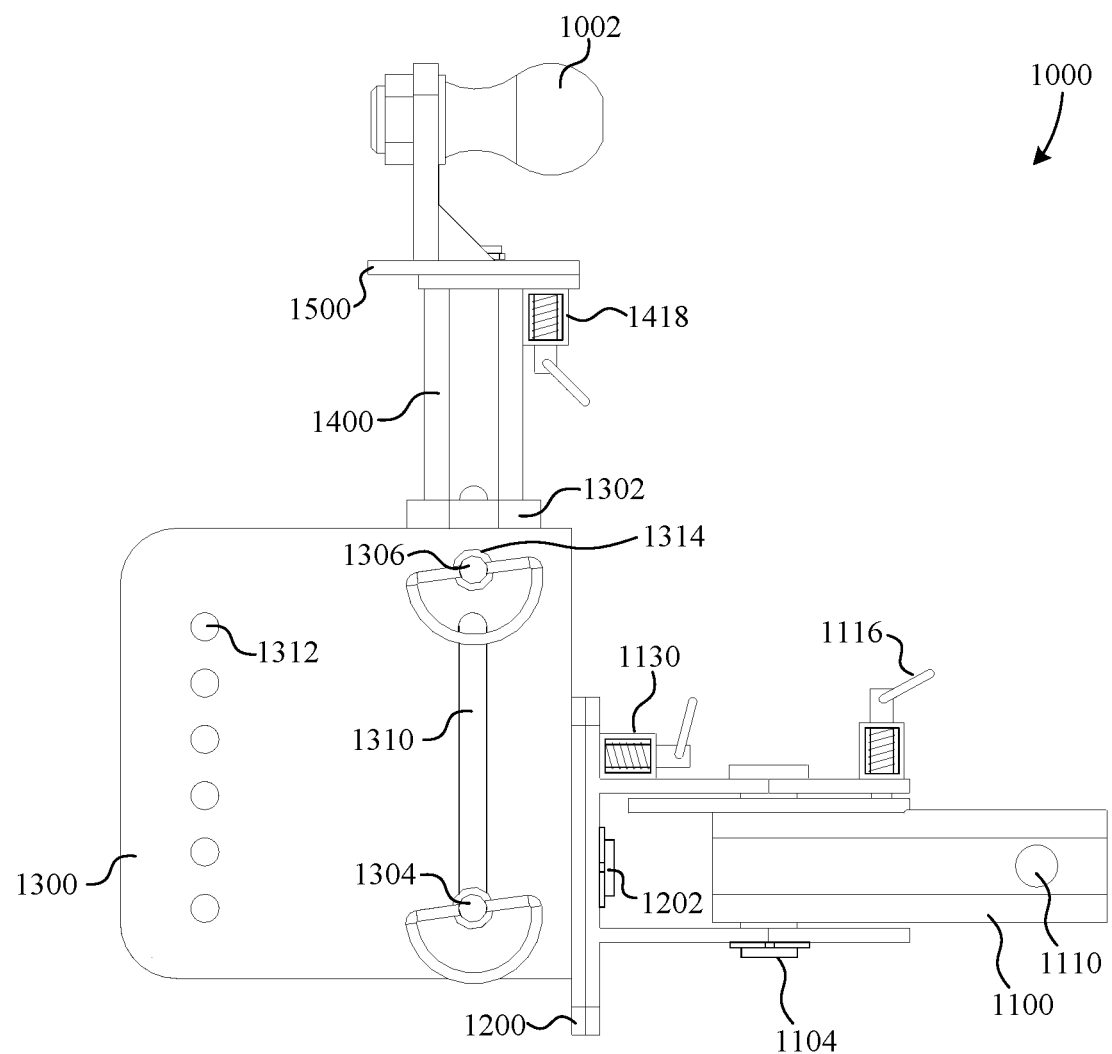
FIG. 19 shows a side view of the trailer coupling mechanism of FIG. 10 in a stowed position.

FIG. 19 is a perspective side view of trailer coupling mechanism 1000 in a stowed position. To move trailer coupling mechanism 1000 from a towing position to a stowed position, pin 1306 is first removed from the rest of trailer coupling mechanism 1000. Then, structure 1302 is rotated upward 90 degrees about pin 1304, thereby aligning aperture 1318 (FIG. 3) of structure 1302 with aperture 1314 of structure 1300. Once aligned, pin 1306 is inserted into aperture 1314 and then secured in place via cotter pin 1322.

Figure 20:
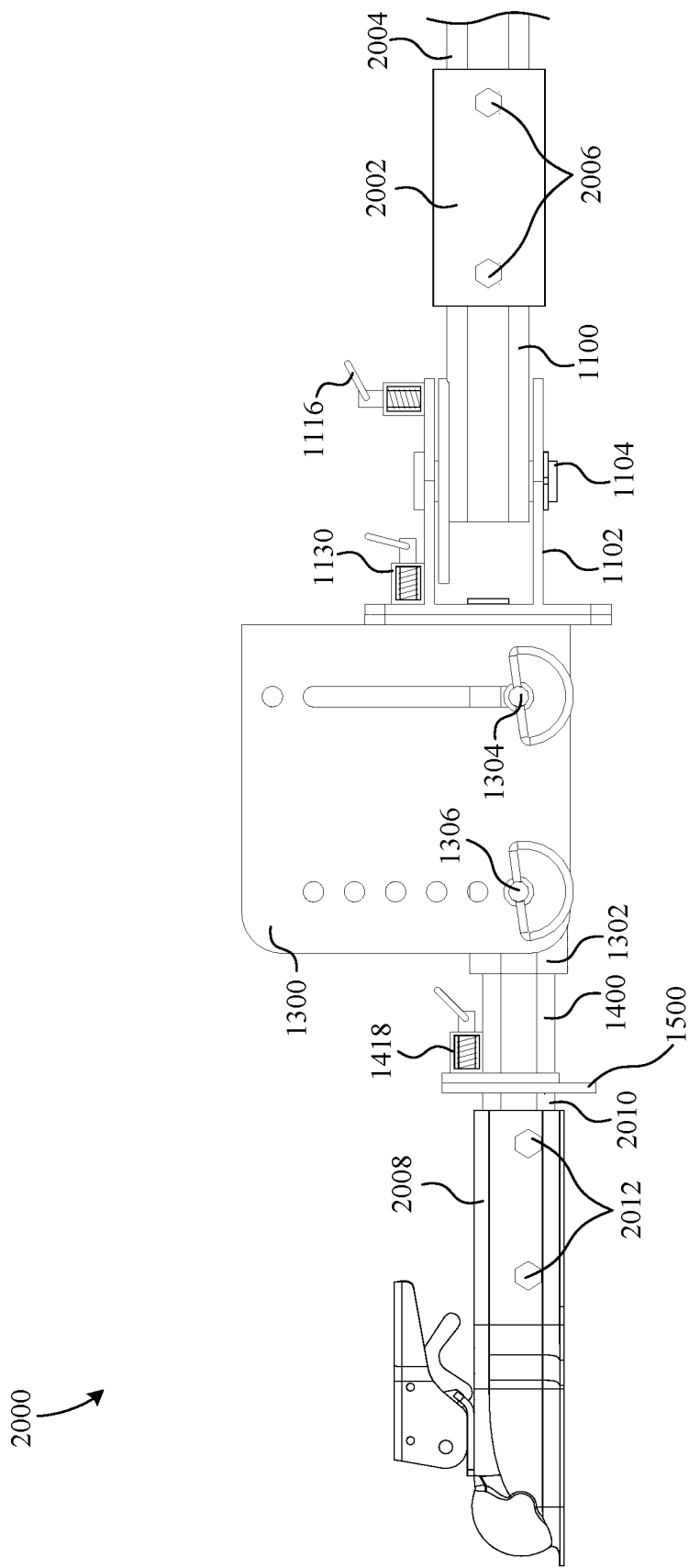
FIG. 20 shows a side view of a trailer coupling mechanism according to another embodiment of the present invention.

FIG. 20 shows a side view of a trailer coupling mechanism 2000 according to yet another embodiment of the present invention. In the example embodiment, trailer coupling mechanism 2000 is substantially similar to trailer coupling mechanism 1000 except that it is adapted to be mounted on a trailer rather than a tow vehicle. That is, the first end of trailer coupling mechanism 2000 includes a mounting assembly 2002 for removably mounting trailer coupling mechanism 2000 to a trailer tongue 2004 via a set of bolts 2006. The opposite second end of trailer coupling mechanism 2000 includes a ball coupler 2008 mounted to a structure 2010 via another set of bolts 2012, where structure 2010 extends from plate 1500. Note that the features and functions of trailer coupling mechanism 2000 that are substantially identical to those of trailer coupling mechanism 1000 are denoted by like reference numbers, and their descriptions are withheld from FIG. 20 to avoid redundancy.

Figure 21:
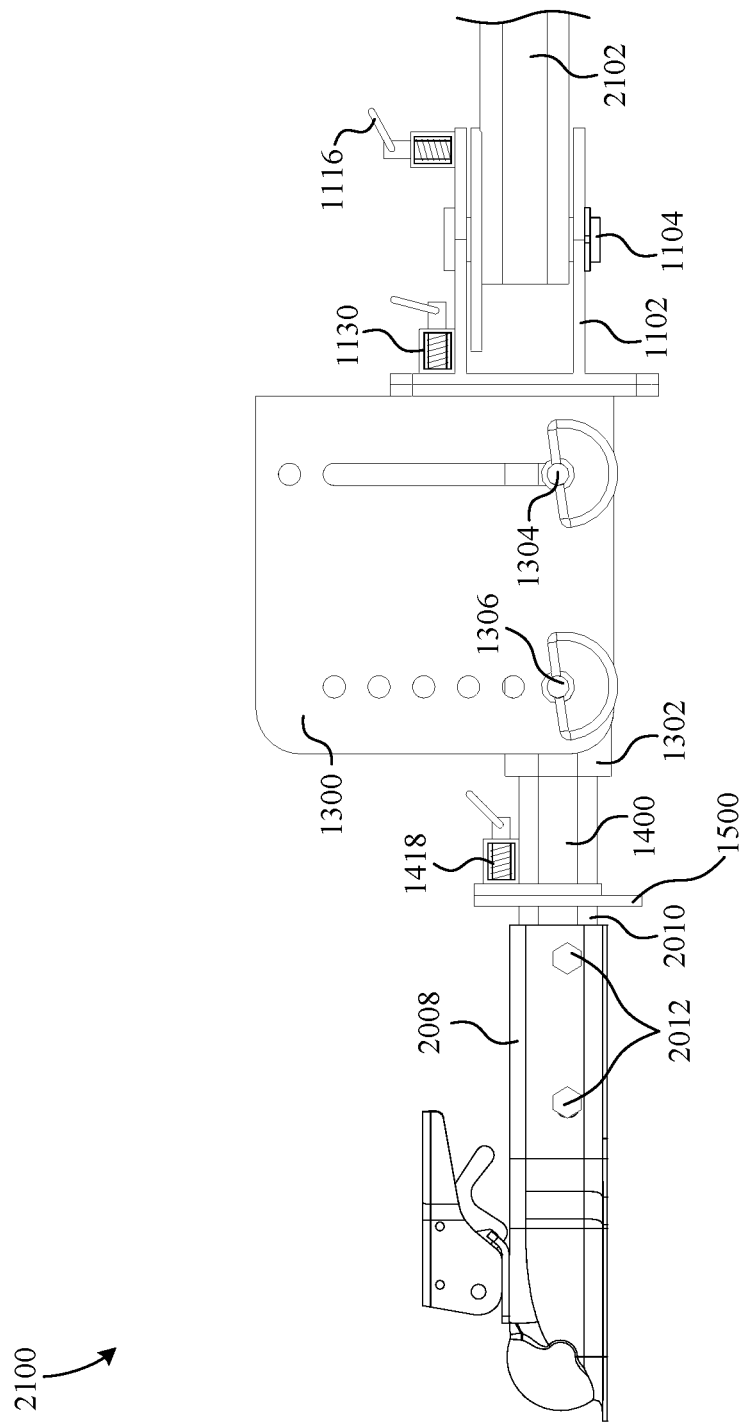
FIG. 21 shows a side view of a trailer coupling mechanism according to yet another embodiment of the present invention.

FIG. 21 shows a side view of a trailer coupling mechanism 2100 according to yet another embodiment of the present invention. In this exemplary embodiment, trailer coupling mechanism 2100 is substantially similar to trailer coupling mechanism 2000 except that it is not removably coupled to a trailer tongue but instead is an integral part of a trailer tongue 2102. Again, the features and functions of trailer coupling mechanism 2100 that are substantially similar to those of trailer coupling mechanism 2000 are denoted by like reference numbers and their descriptions are withheld from FIG. 22 to avoid redundancy.

Figure 22:
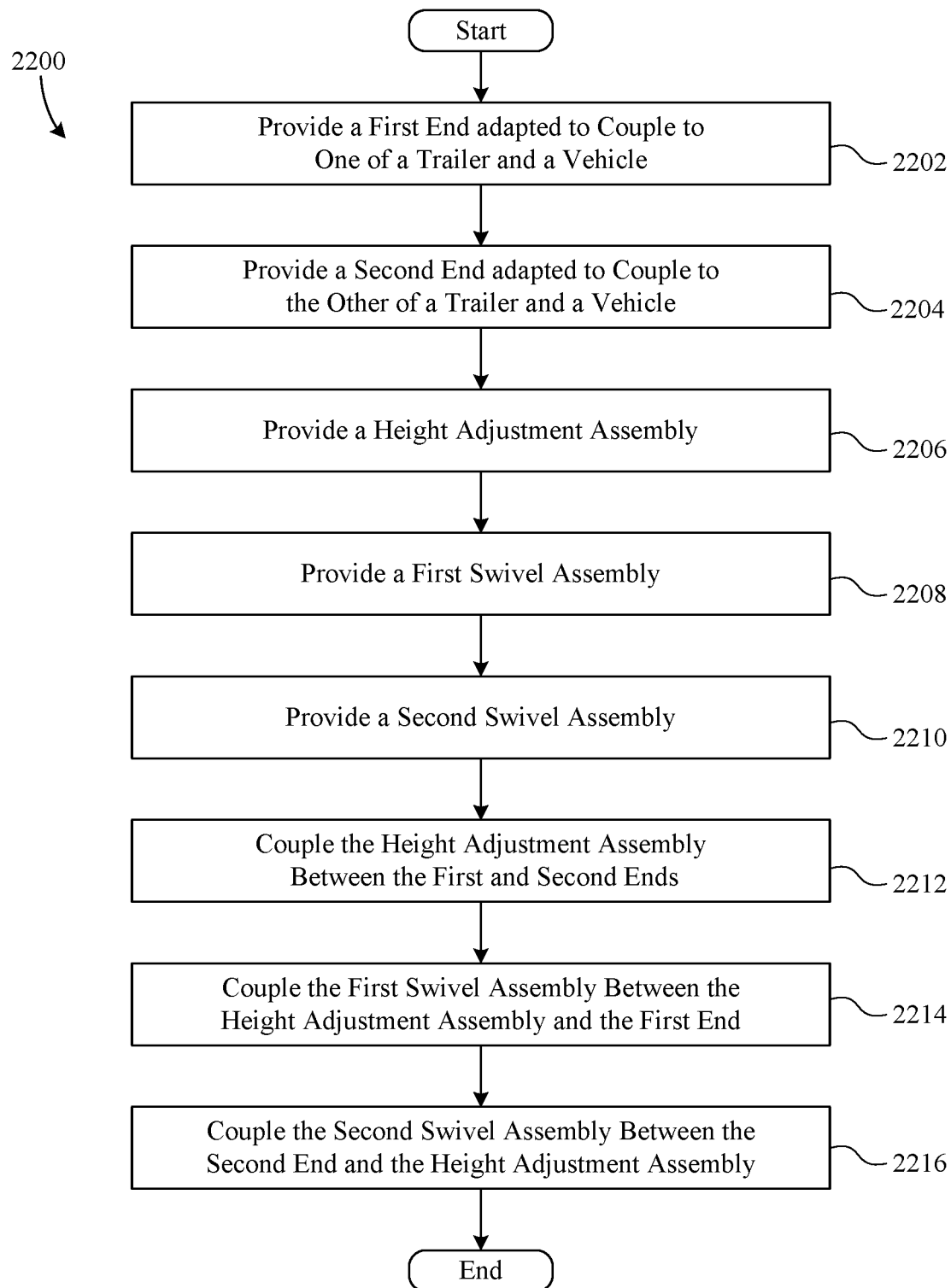
FIG. 22 is a flowchart summarizing an exemplary method of manufacturing a trailer coupling mechanism according to the present invention.

FIG. 22 is a flowchart summarizing an exemplary method 2200 of manufacturing a trailer coupling mechanism according to the present invention. In a first step 2202, a first end adapted to couple to one of a trailer and a tow vehicle is provided, and in a second step 2204, a second end adapted to couple to the other of the trailer and the tow vehicle is provided. In a third step 2206, a height adjustment assembly is provided. In a fourth step 2208, a first swivel assembly is provided, and in a fifth step 2210, a second swivel assembly is provided. In a sixth step 2212, the height adjustment assembly is coupled between the first and second ends such that it is operative to adjust the relative height between the first and second ends. In a seventh step 2214, the first swivel assembly is coupled between the height adjustment assembly and the first end to facilitate rotation of the first end with respect to the height adjustment assembly about a first axis. In an eight step, the second swivel assembly is coupled between the second end and the height adjustment assembly to facilitate rotation of the height adjustment assembly with respect to the second end about a second axis that is parallel to the first axis.

In some embodiments, the first end comprises a tow ball, and the second end comprises a structure for insertion into a hitch receiver of a tow vehicle. In other embodiments, the first end comprises a ball receiver, and the second end comprises a trailer tongue or a member adapted to couple to a trailer tongue.

The description of particular embodiments of the present invention is now complete. Many of the described features may be substituted, altered or omitted without departing from the scope of the invention. For example, alternative types of trailer coupling devices (e.g., pintle hitch, pintle ring, etc.), may be substituted for the hitch balls and ball couplers described herein. As another example, alternative locking mechanisms (e.g., a lever-actuated clamp, turn latches, etc.) can be used instead of spring pins. These and other deviations from the particular embodiments shown will be apparent to those skilled in the art, particularly in view of the foregoing disclosure.

I claim:

1. A trailer coupling mechanism comprising:
   a first end adapted to couple to one of a trailer and a vehicle;
   a second end adapted to couple to the other of said trailer and said vehicle;
   a height adjustment assembly coupled between said first end and said second end and operative to adjust the relative height between said first end and said second end;
   a first swivel assembly coupled between said height adjustment assembly and said first end to facilitate rotation of said first end with respect to said height adjustment assembly about a first axis; and
   a second swivel assembly coupled between said second end and said height adjustment assembly to facilitate rotation of said height adjustment assembly with respect to said second end about a second axis parallel to said first axis; and wherein
   said height adjustment assembly includes a first frame structure and a second frame structure;
   said first frame structure is coupled to said first swivel assembly;
   said second frame structure is coupled to said second swivel assembly; and
   said first frame structure is adjustably coupled to said second frame structure.

2. The trailer coupling mechanism of claim 1, wherein:
   said height adjustment assembly further includes a first pin and a second pin;
   said first frame structure includes a first aperture adapted to receive said first pin and a second aperture adapted to receive said second pin; and
   said second frame structure includes a set of sidewalls disposed on opposite sides of said first frame structure, each of said sidewalls including a vertical column of apertures and a vertical channel extending parallel with respect to said vertical column of apertures, said vertical column of said apertures being adapted to receive said first pin and said channel being adapted to receive said second pin.

3. The trailer coupling mechanism of claim 2, wherein:
   said vertical column of apertures of each of said sidewalls includes a first end aperture and an opposite second end aperture; and
   the distance between said first end aperture and said second axis is less than the distance between said second end aperture and said second axis.

4. The trailer coupling mechanism of claim 2, wherein:
   each of said sidewalls further includes a stow position aperture vertically aligned with said channel;
   said stow position aperture of each of said sidewalls is coaxially aligned with said stow position aperture of each of the others of said sidewalls;
   said first pin is configured to simultaneously engage said stow position aperture of each of said sidewalls; and
   said first axis and said second axis are perpendicular to one another when said first pin is disposed in said stow position aperture of each of said sidewalls.

5. The trailer coupling mechanism of claim 2, further comprising a length adjustment structure coupled between said first swivel assembly and said first frame structure, said length adjustment structure facilitating the adjustment in distance between said first swivel assembly and said first frame structure.

6. The trailer coupling mechanism of claim 5, wherein:
said length adjustment structure is slidably disposed in said first frame structure; and
said length adjustment structure includes a plurality of side apertures aligned in a row, each of said apertures being adapted to receive said first pin.

7. The trailer coupling mechanism of claim 6, wherein:
said length adjustment structure further includes a top channel and an opposite bottom channel having a shaft slidably disposed therethrough to prevent said length adjustment structure from being removed from said first frame structure; and
said first frame structure further includes a top aperture and an opposite coaxially aligned bottom aperture, said shaft of said length adjustment structure being simultaneously disposed in said top aperture and said bottom aperture of said first frame structure.

8. The trailer coupling mechanism of claim 5, further comprising a horizontal pivot assembly coupled between said second swivel assembly and said second end to facilitate horizontal rotation of said height adjustment assembly with respect to said second end about a third axis, said third axis being perpendicular to said second axis.

9. The trailer coupling mechanism of claim 1, further comprising a horizontal pivot assembly coupled between said second swivel assembly and said second end.

10. The trailer coupling mechanism of claim 9, wherein said horizontal pivot assembly includes a locking feature operative to prevent horizontal rotation of said height adjustment assembly with respect to said second end when said first axis and said second axis are parallel to one another.

11. The trailer coupling mechanism of claim 10, wherein said locking feature is adapted to automatically lock responsive to a tensile force asserted on said horizontal pivot assembly.

12. The trailer coupling mechanism of claim 1, wherein:
said first swivel assembly further includes a first locking mechanism operative to lock said first end in a first position about said first axis with respect to said height adjustment assembly;
said first locking mechanism of said first swivel assembly is operative to lock said first end in a second position about said first axis with respect to said height adjustment assembly, said second position being located 180 degrees about said first axis from said first position;
said second swivel assembly further includes a second locking mechanism operative to lock said height adjustment assembly in a first position about said second axis with respect to said second end; and
said second locking mechanism of said second swivel assembly is operative to lock said height adjustment assembly in a second position about said second axis with respect to said second end, said second position of said second swivel assembly being located 180 degrees about said second axis from said first position of said second swivel assembly.

13. The trailer coupling mechanism of claim 12, wherein at least one of said first locking mechanism and said second locking mechanism includes a spring pin.

14. The trailer coupling mechanism of claim 1, wherein said first end includes a tow ball and said second end is adapted to be received by a tow hitch receiver.

15. The trailer coupling mechanism of claim 1, wherein said first end includes a ball coupler and said second end is adapted to be coupled to a trailer tongue.

16. The trailer coupling mechanism of claim 1, wherein said first end includes a ball coupler and said second end comprises a trailer tongue.

17. A trailer having a trailer coupling mechanism, said trailer coupling mechanism comprising:
a first end adapted to couple to a ball coupler;
a second end coupled to a tongue of said trailer;
a height adjustment assembly coupled between said first end and said second end and operative to adjust the relative height between said first end and said second end;
a first swivel assembly coupled between said height adjustment assembly and said first end to facilitate rotation of said first end with respect to said height adjustment assembly about a first axis;
a second swivel assembly coupled between said second end and said height adjustment assembly to facilitate rotation of said height adjustment assembly with respect to said second end about a second axis parallel to said first axis; and
a horizontal pivot assembly coupled between said second swivel assembly and said second end.

18. A trailer coupling mechanism comprising:
a first end adapted to couple to one of a trailer and a vehicle;
a second end adapted to couple to the other of said trailer and said vehicle;
a height adjustment assembly coupled between said first end and said second end and operative to adjust the relative height between said first end and said second end;
means for rotating said first end with respect to said height adjustment assembly about a first axis; and
means for rotating said height adjustment assembly with respect to said second end about a second axis parallel to said first axis; and
a horizontal pivot assembly coupled between said second end and said means for rotating said height adjustment assembly with respect to said second end about a second axis parallel to said first axis.

19. A trailer coupling mechanism comprising:
a first end adapted to couple to one of a trailer and a vehicle;
a second end adapted to couple to the other of said trailer and said vehicle;
a height adjustment assembly coupled between said first end and said second end and operative to adjust the relative height between said first end and said second end;
a first swivel assembly coupled between said height adjustment assembly and said first end to facilitate rotation of said first end with respect to said height adjustment assembly about a first axis;
a second swivel assembly coupled between said second end and said height adjustment assembly to facilitate rotation of said height adjustment assembly with respect to said second end about a second axis parallel to said first axis; and
a horizontal pivot assembly coupled between said second swivel assembly and said second end.

20. The trailer coupling mechanism of claim 19, wherein:
said height adjustment assembly includes a first frame structure and a second frame structure;
said first frame structure is coupled to said first swivel assembly;
said second frame structure is coupled to said second swivel assembly;

said first frame structure is adjustably coupled to said second frame structure;

said height adjustment assembly further includes a first pin and a second pin;

said first frame structure includes a first aperture adapted to receive said first pin and a second aperture adapted to receive said second pin; and said second frame structure includes a set of sidewalls disposed on opposite sides of said first frame structure, each of said sidewalls including a vertical column of apertures and a vertical channel extending parallel with respect to said vertical column of apertures, said vertical column of said apertures being adapted to receive said first pin and said channel being adapted to receive said second pin.

21. The trailer coupling mechanism of claim 20, wherein:
said vertical column of apertures of each of said sidewalls includes a first end aperture and an opposite second end aperture; and
a distance between said first end aperture and said second axis is less than a distance between said second end aperture and said second axis.

22. The trailer coupling mechanism of claim 20, wherein:
each of said sidewalls further includes a stow position aperture vertically aligned with said channel;
said stow position aperture of each of said sidewalls is coaxially aligned with said stow position aperture of each of the others of said sidewalls;
said first pin is configured to simultaneously engage said stow position aperture of each of said sidewalls; and
said first axis and said second axis are perpendicular to one another when said first pin is disposed in said stow position aperture of each of said sidewalls.

23. The trailer coupling mechanism of claim 20, further comprising a length adjustment structure coupled between said first swivel assembly and said first frame structure, said length adjustment structure facilitating adjustment in distance between said first swivel assembly and said first frame structure.

24. The trailer coupling mechanism of claim 23, wherein:
said length adjustment structure is slidably disposed in said first frame structure; and
said length adjustment structure includes a plurality of side apertures aligned in a row, each of said apertures being adapted to receive said first pin.

25. The trailer coupling mechanism of claim 24, wherein:
said length adjustment structure further includes a top channel and an opposite bottom channel having a shaft slidably disposed therethrough to prevent said length adjustment structure from being removed from said first frame structure; and
said first frame structure further includes a top aperture and an opposite coaxially aligned bottom aperture, said shaft of said length adjustment structure being simultaneously disposed in said top aperture and said bottom aperture of said first frame structure.

26. The trailer coupling mechanism of claim 23, wherein said horizontal pivot assembly facilitates horizontal rotation of said height adjustment assembly with respect to said second end about a third axis, said third axis being perpendicular to said second axis.

27. The trailer coupling mechanism of claim 19, wherein said horizontal pivot assembly includes a locking feature operative to prevent horizontal rotation of said height adjustment assembly with respect to said second end when said first axis and said second axis are parallel to one another.

28. The trailer coupling mechanism of claim 27, wherein said locking feature is adapted to automatically lock responsive to a tensile force asserted on said horizontal pivot assembly.

29. The trailer coupling mechanism of claim 19, wherein:
said first swivel assembly further includes a first locking mechanism operative to lock said first end in a first position about said first axis with respect to said height adjustment assembly;
said first locking mechanism of said first swivel assembly is operative to lock said first end in a second position about said first axis with respect to said height adjustment assembly, said second position being located 180 degrees about said first axis from said first position;
said second swivel assembly further includes a second locking mechanism operative to lock said height adjustment assembly in a first position about said second axis with respect to said second end; and
said second locking mechanism of said second swivel assembly is operative to lock said height adjustment assembly in a second position about said second axis with respect to said second end, said second position of said second swivel assembly being located 180 degrees about said second axis from said first position of said second swivel assembly.

30. The trailer coupling mechanism of claim 29, wherein at least one of said first locking mechanism and said second locking mechanism includes a spring pin.

31. The trailer coupling mechanism of claim 19, wherein said first end includes a tow ball and said second end is adapted to be received by a tow hitch receiver.

32. The trailer coupling mechanism of claim 19, wherein said first end includes a ball coupler and said second end is adapted to be coupled to a trailer tongue.

33. The trailer coupling mechanism of claim 19, wherein said first end includes a ball coupler and said second end comprises a trailer tongue.

34. A trailer coupling mechanism comprising:
a first end adapted to couple to one of a trailer and a vehicle;
a second end adapted to couple to the other of said trailer and said vehicle;
a height adjustment assembly coupled between said first end and said second end and operative to adjust the relative height between said first end and said second end;
a first swivel assembly coupled between said height adjustment assembly and said first end to facilitate rotation of said first end with respect to said height adjustment assembly about a first axis; and
a second swivel assembly coupled between said second end and said height adjustment assembly to facilitate rotation of said height adjustment assembly with respect to said second end about a second axis parallel to said first axis; and
wherein said first swivel assembly further includes a first locking mechanism operative to lock said first end in a first position about said first axis with respect to said height adjustment assembly;
said first locking mechanism of said first swivel assembly is operative to lock said first end in a second position about said first axis with respect to said height adjustment assembly, said second position being located 180 degrees about said first axis from said first position;
said second swivel assembly further includes a second locking mechanism operative to lock said height adjustment assembly in a first position about said second axis with respect to said second end; and said second locking mechanism of said second swivel assembly is operative to lock said height adjustment assembly in a second position about said second axis with respect to said second end, said second position of said second swivel assembly being located 180 degrees about said second axis from said first position of said second swivel assembly.

35. The trailer coupling mechanism of claim 34, wherein:
said height adjustment assembly includes a first frame structure and a second frame structure;
said first frame structure is coupled to said first swivel assembly;
said second frame structure is coupled to said second swivel assembly;
said first frame structure is adjustably coupled to said second frame structure;
said height adjustment assembly further includes a first pin and a second pin;
said first frame structure includes a first aperture adapted to receive said first pin and a second aperture adapted to receive said second pin; and
said second frame structure includes a set of sidewalls disposed on opposite sides of said first frame structure, each of said sidewalls including a vertical column of apertures and a vertical channel extending parallel with respect to said vertical column of apertures, said vertical column of said apertures being adapted to receive said first pin and said channel being adapted to receive said second pin.

36. The trailer coupling mechanism of claim 35, wherein:
said vertical column of apertures of each of said sidewalls includes a first end aperture and an opposite second end aperture; and
the distance between said first end aperture and said second axis is less than the distance between said second end aperture and said second axis.

37. The trailer coupling mechanism of claim 35, wherein:
each of said sidewalls further includes a stow position aperture vertically aligned with said channel;
said stow position aperture of each of said sidewalls is coaxially aligned with said stow position aperture of each of the others of said sidewalls;
said first pin is configured to simultaneously engage said stow position aperture of each of said sidewalls; and
said first axis and said second axis are perpendicular to one another when said first pin is disposed in said stow position aperture of each of said sidewalls.

38. The trailer coupling mechanism of claim 35, further comprising a length adjustment structure coupled between said first swivel assembly and said first frame structure, said length adjustment structure facilitating the adjustment in distance between said first swivel assembly and said first frame structure.

39. The trailer coupling mechanism of claim 38, wherein:
said length adjustment structure is slidably disposed in said first frame structure; and
said length adjustment structure includes a plurality of side apertures aligned in a row, each of said apertures being adapted to receive said first pin.

40. The trailer coupling mechanism of claim 38, wherein:
said length adjustment structure further includes a top channel and an opposite bottom channel having a shaft slidably disposed therethrough to prevent said length adjustment structure from being removed from said first frame structure; and
said first frame structure further includes a top aperture and an opposite coaxially aligned bottom aperture, said shaft of said length adjustment structure being simultaneously disposed in said top aperture and said bottom aperture of said first frame structure.

41. The trailer coupling mechanism of claim 38, further comprising a horizontal pivot assembly coupled between said second swivel assembly and said second end to facilitate horizontal rotation of said height adjustment assembly with respect to said second end about a third axis, said third axis being perpendicular to said second axis.

42. The trailer coupling mechanism of claim 34, further comprising a horizontal pivot assembly coupled between said second swivel assembly and said second end, and wherein:
said horizontal pivot assembly includes a locking feature operative to prevent horizontal rotation of said height adjustment assembly with respect to said second end when said first axis and said second axis are parallel to one another.

43. The trailer coupling mechanism of claim 42, wherein said locking feature is adapted to automatically lock responsive to a tensile force asserted on said horizontal pivot assembly.

44. The trailer coupling mechanism of claim 34, wherein at least one of said first locking mechanism and said second locking mechanism includes a spring pin.

45. The trailer coupling mechanism of claim 34, wherein said first end includes a tow ball and said second end is adapted to be received by a tow hitch receiver.

46. The trailer coupling mechanism of claim 34, wherein said first end includes a ball coupler and said second end is adapted to be coupled to a trailer tongue.

47. The trailer coupling mechanism of claim 34, wherein said first end includes a ball coupler and said second end comprises a trailer tongue.

* * * * *